United States Patent
Nishikawa et al.

(10) Patent No.: US 11,180,661 B2
(45) Date of Patent: Nov. 23, 2021

(54) BINDER COMPOSITION, BINDER LAYER, OPTICAL LAMINATE, AND IMAGE DISPLAY DEVICE

(71) Applicant: FUJIFILM Corporation, Tokyo (JP)

(72) Inventors: Hideyuki Nishikawa, Kanagawa (JP); Kunihiro Atsumi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/937,599

(22) Filed: Jul. 24, 2020

(65) Prior Publication Data

US 2020/0354583 A1    Nov. 12, 2020

Related U.S. Application Data

(63) Continuation of application No. PCT/JP2019/003492, filed on Jan. 31, 2019.

(30) Foreign Application Priority Data

Feb. 15, 2018 (JP) .............................. JP2018-024829

(51) Int. Cl.
| | |
|---|---|
| *C09D 4/06* | (2006.01) |
| *C09D 135/02* | (2006.01) |
| *C09D 163/00* | (2006.01) |
| *G02B 5/30* | (2006.01) |
| *C08F 20/30* | (2006.01) |
| *G02F 1/13363* | (2006.01) |
| *G02F 1/1337* | (2006.01) |
| *C09K 19/56* | (2006.01) |

(52) U.S. Cl.
CPC .............. *C09D 4/06* (2013.01); *C08F 20/30* (2013.01); *C09D 135/02* (2013.01); *C09D 163/00* (2013.01); *C09K 19/56* (2013.01); *G02B 5/3016* (2013.01); *G02F 1/13363* (2013.01); *G02F 1/133711* (2013.01); *C09K 2323/02* (2020.08); *C09K 2323/05* (2020.08); *C09K 2323/055* (2020.08)

(58) Field of Classification Search
CPC ...... C09D 4/06; C09D 135/02; C09D 163/00; G02B 5/3016; G02B 5/3083; C09K 2323/02; C09K 2323/05; C09K 2323/055; C09K 19/56; G02F 1/133711; G02F 1/133788; G02F 1/1337; G02F 1/13363
USPC ........... 428/1.2, 1.5, 1.53, 1.3; 349/117, 123
See application file for complete search history.

(56) References Cited

U.S. PATENT DOCUMENTS

| | | | | |
|---|---|---|---|---|
| 2011/0068301 | A1* | 3/2011 | Akiike | ..................... C08L 83/06 252/299.4 |
| 2014/0339470 | A1 | 11/2014 | Katoh et al. | |
| 2014/0374657 | A1 | 12/2014 | Matsuyama et al. | |
| 2016/0194275 | A1 | 7/2016 | Kokin | |
| 2016/0355736 | A1 | 12/2016 | Motooka et al. | |
| 2018/0079961 | A1* | 3/2018 | Eckert | ................ C08G 73/1042 |

FOREIGN PATENT DOCUMENTS

| | | |
|---|---|---|
| CN | 102068937 | 5/2011 |
| JP | S55035020 | 3/1980 |
| JP | H06073369 | 3/1994 |
| JP | 2006017930 | 1/2006 |
| JP | 2012078501 | 4/2012 |
| JP | 2013173881 | 9/2013 |
| JP | 2013185030 | 9/2013 |
| JP | 2014215360 | 11/2014 |
| JP | 2015152744 | 8/2015 |
| JP | 2016050275 | 4/2016 |
| JP | 2016079189 | 5/2016 |
| KR | 20090030701 | 3/2009 |
| WO | 9220721 | 11/1992 |
| WO | 2015019809 | 2/2015 |
| WO | 2017065080 | 4/2017 |
| WO | 2018216812 | 11/2018 |

OTHER PUBLICATIONS

"Office Action of Japan Counterpart Application" with English translation thereof, dated Feb. 2, 2021, p. 1-p. 6.
"International Search Report (Form PCT/ISA/210)" of PCT/JP2019/003492, dated Apr. 16, 2019, with English translation thereof, pp. 1-5.
"Written Opinion of the International Searching Authority (Form PCT/ISA/237)" of PCT/JP2019/003492, dated Apr. 16, 2019, with English translation thereof, pp. 1-7.

* cited by examiner

*Primary Examiner* — Ruiyun Zhang
(74) *Attorney, Agent, or Firm* — JCIPRNET

(57) ABSTRACT

An object of the present invention is to provide a binder composition which is excellent in upper layer coatability after being formed as a binder layer and can improve liquid crystal aligning properties, a binder layer, an optical laminate, and an image display device. A binder composition according to the embodiment of the present invention is a binder composition containing: a binder; a polymerization initiator; a surfactant; and a photo-alignment agent, in which the surfactant and the photo-alignment agent include functional groups capable of hydrogen bonding with each other, and the functional group capable of hydrogen bonding included in any one of the surfactant or the photo-alignment agent is a proton-donating functional group, and the functional group included in the other of the surfactant or the photo-alignment agent is a proton-accepting functional group.

11 Claims, No Drawings

BINDER COMPOSITION, BINDER LAYER, OPTICAL LAMINATE, AND IMAGE DISPLAY DEVICE

CROSS-REFERENCE TO RELATED APPLICATIONS

This application is a Continuation of PCT International Application No. PCT/JP2019/003492 filed on Jan. 31, 2019, which claims priority under 35 U.S.C. § 119(a) to Japanese Patent Application No. 2018-024829 filed on Feb. 15, 2018. The above application is hereby expressly incorporated by reference, in its entirety, into the present application.

BACKGROUND OF THE INVENTION

1. Field of the Invention

The present invention relates to a binder composition, a binder layer, an optical laminate, and an image display device.

2. Description of the Related Art

Optical films such as optical compensation sheets or retardation films are used in various image display devices from the viewpoint of solving image staining or enlarging a view angle.

A stretched birefringence film has been used as an optical film, but in recent years, it has been proposed to use an optically anisotropic layer formed of a liquid crystal compound in place of the stretched birefringence film.

For example, JP2014-215360A describes that a liquid crystal composition containing a liquid crystalline compound having a polymerizable group and a photo-alignment compound is used as a liquid crystal composition which eliminates the need of a rubbing treatment on a lower optically anisotropic layer in producing a retardation plate having at least two optically anisotropic layers ([Claim 1], [Claim 6], and [Claim 8]).

SUMMARY OF THE INVENTION

The present inventors have conducted studies on the liquid crystal composition described in JP2014-215360A, and found that depending on the type of a fluorine-based surfactant to be used, the coatability (hereinafter, also referred to as "upper layer coatability") of an optically anisotropic layer composition to be provided on an upper layer of the formed optically anisotropic layer may deteriorate, or the aligning properties (hereinafter, also referred to as "liquid crystal aligning properties") of an optically anisotropic layer to be provided on the upper layer may deteriorate.

Accordingly, an object of the present invention is to provide a binder composition which is excellent in upper layer coatability after being formed as a binder layer and can improve liquid crystal aligning properties, a binder layer, an optical laminate, and an image display device.

The present inventors have conducted intensive studies to achieve the above object, and as a result, found that in a case where in a binder composition containing a binder, a polymerization initiator, a surfactant, and a photo-alignment agent, the surfactant and the photo-alignment agent include functional groups capable of hydrogen bonding with each other, the functional group capable of hydrogen bonding included in any one of the surfactant or the photo-alignment agent is a proton-donating functional group, and the functional group included in the other of the surfactant or the photo-alignment agent is a proton-accepting functional group, excellent upper layer coatability is provided after formation as a binder layer and liquid crystal aligning properties are improved, and completed the present invention.

That is, the inventors have found that the object can be achieved with the following configuration.

[1] A binder composition comprising: a binder; a polymerization initiator; a surfactant; and a photo-alignment agent, in which the surfactant and the photo-alignment agent include functional groups capable of hydrogen bonding with each other, and the functional group capable of hydrogen bonding included in any one of the surfactant or the photo-alignment agent is a proton-donating functional group, and the functional group included in the other of the surfactant or the photo-alignment agent is a proton-accepting functional group.

[2] The binder composition according to [1], in which the proton-donating functional group is at least one type of functional group selected from the group consisting of —COOH, —SO$_3$H, —PO$_3$H, —SO$_2$H, —(Rs)Si(Rs)OH, a hydroxyl group substituted for a hydrogen atom on an aromatic ring, and a mercapto group substituted for a hydrogen atom on an aromatic ring, and the proton-accepting functional group is at least one type of functional group selected from the group consisting of —NH2, —NH—, —N(Rt)-, and —N=, where Rs and Rt represent a substituent in the functional groups.

[3] The binder composition according to [1] or [2], in which the surfactant is a low-molecular-weight compound or an oligomer, and the photo-alignment agent is an oligomer or a polymer compound.

[4] The binder composition according to any one of [1] to [3], in which the surfactant is a compound represented by any one of Formula (1-1), Formula (1-2), or Formula (1-3) to be described later.

[5] The binder composition according to any one of [1] to [4], in which the photo-alignment agent is a polymer having a repeating unit represented by any one of Formula (2-1), Formula (2-2), or Formula (2-3) to be described later, or a repeating unit represented by any one of Formula (3-1), Formula (3-2), or Formula (3-3) to be described later.

[6] The binder composition according to any one of [1] to [4], in which the photo-alignment agent is a copolymer having a repeating unit represented by any one of Formula (4-1-1), Formula (4-1-2), or Formula (4-1-3) to be described later and a repeating unit represented by any one of Formula (4-2-1), Formula (4-2-2), or Formula (4-2-3) to be described later.

[7] The binder composition according to any one of [1] to [4], in which the photo-alignment agent is a polymer having a repeating unit represented by any one of Formula (5-1), Formula (5-2), or Formula (5-3) to be described later.

[8] A binder layer which is formed using the binder composition according to any one of [1] to [7].

[9] An optical laminate comprising: the binder layer according to [8]; and an optically anisotropic layer which is provided on the binder layer, in which the optically anisotropic layer is formed using a polymerizable liquid crystal composition containing a polymerizable liquid crystal compound, and the binder layer and the optically anisotropic layer are laminated adjacent to each other.

[10] An image display device comprising: the binder layer according to [8]; or the optical laminate according to [9].

According to the present invention, it is possible to provide a binder composition which is excellent in upper layer coatability after being formed as a binder layer and can improve liquid crystal aligning properties, a binder layer, an optical laminate, and an image display device.

DESCRIPTION OF THE PREFERRED EMBODIMENTS

Hereinafter, the present invention will be described in detail.

The following description of constituent requirements is based on typical embodiments of the present invention, but the present invention is not limited thereto.

In this specification, a numerical value range expressed using "to" means a range including numerical values before and after "to" as a lower limit value and an upper limit value.

[Binder Composition]

A binder composition according to the embodiment of the present invention is a binder composition containing a binder, a polymerization initiator, a surfactant, and a photo-alignment agent.

The surfactant and the photo-alignment agent contained in the binder composition according to the embodiment of the present invention include functional groups capable of hydrogen bonding with each other. The functional group capable of hydrogen bonding included in any one of the surfactant or the photo-alignment agent is a proton-donating functional group, and the functional group included in the other of the surfactant or the photo-alignment agent is a proton-accepting functional group.

The expression "include functional groups capable of hydrogen bonding with each other" means that the surfactant and the photo-alignment agent each have a functional group, and these functional groups are capable of hydrogen bonding with each other.

Here, the "proton-donating functional group" refers to a Bronsted acid capable of donating a hydrogen atom, and in the present invention, it is preferably at least one type of functional group selected from the group consisting of —COOH, —SO$_3$H, —PO$_3$H, —SO$_2$H, —(Rs)Si(Rs)OH, a hydroxyl group substituted for a hydrogen atom on an aromatic ring, and a mercapto group substituted for a hydrogen atom on an aromatic ring.

Here, Rs represents a substituent, and the substituent Rs in —(Rs)Si(Rs)OH is preferably a substituent which does not inhibit the proton-donating functional group as a whole.

Specific examples of such a substituent Rs include a hydrogen atom and an alkyl group having 1 to 8 carbon atoms. Among these, an alkyl group having 1 to 4 carbon atoms (for example, a methyl group, an ethyl group, a propyl group, an isopropyl group, an n-butyl group, an isobutyl group, a sec-butyl group, and a t-butyl group) is preferable, and a methyl group or an ethyl group is more preferable.

The "proton-accepting functional group" refers to a Bronsted base which can accept a hydrogen atom, and in the present invention, it is preferably at least one type of functional group selected from the group consisting of —NH$_2$, —NH—, —N(Rt)-, and —N=.

Here, Rt represents a substituent, and the substituent Rt in —N(Rt)- is preferably a substituent which does not inhibit the proton-accepting functional group as a whole.

Specific examples of such a substituent Rt include an alkyl group having 1 to 8 carbon atoms. Among these, an alkyl group having 1 to 4 carbon atoms (for example, a methyl group, an ethyl group, a propyl group, an isopropyl group, an n-butyl group, an isobutyl group, a sec-butyl group, and a t-butyl group) is preferable, and a methyl group or an ethyl group is more preferable.

In the present invention, as described above, in a case where the surfactant and the photo-alignment agent contained in the binder composition include functional groups capable of hydrogen bonding with each other, the functional group capable of hydrogen bonding included in any one of the surfactant or the photo-alignment agent is a proton-donating functional group, and the functional group included in the other of the surfactant or the photo-alignment agent is a proton-accepting functional group, excellent upper layer coatability is provided after formation as a binder layer and liquid crystal aligning properties are improved.

Although the detailed reason for this is not clear, the inventors presume as follows.

That is, it is thought that using the binder composition according to the embodiment of the present invention, the photo-alignment agent hydrogen-bonded with the surfactant is more likely to be unevenly distributed on the air interface side of a binder layer to be formed, and thus a photo-alignment group is aligned, and the liquid crystal aligning properties of an optically anisotropic layer to be formed on the upper layer are improved.

In addition, it is thought that since the hydrogen bond between the surfactant and the photo-alignment agent is weakened or broken after light irradiation, the surfactant is volatilized from the air interface side of the binder layer or easily transferred to the coating liquid of the upper layer, and thus the upper layer coatability is improved.

Hereinafter, the binder, the polymerization initiator, the surfactant, the photo-alignment agent, and optional components contained in the binder composition according to the embodiment of the present invention will be described in detail.

[Binder]

The binder contained in the binder composition according to the embodiment of the present invention is not particularly limited. The binder itself may be a resin (hereinafter, also referred to as "resin binder") which is formed only of a resin having no polymerization reactivity and simply dried and solidified, or a polymerizable compound.

<Resin Binder>

Specific examples of the resin binder include an epoxy resin, a diallyl phthalate resin, a silicone resin, a phenol resin, an unsaturated polyester resin, a polyimide resin, a polyurethane resin, a melamine resin, an urea resin, an ionomer resin, an ethylene ethyl acrylate resin, an acrylonitrile acrylate styrene copolymer resin, an acrylonitrile styrene resin, an acrylonitrile chloride polyethylene styrene copolymer resin, an ethylene-vinyl acetate resin, an ethylene vinyl alcohol copolymer resin, an acrylonitrile butadiene styrene copolymer resin, a vinyl chloride resin, a chlorinated polyethylene resin, a polyvinylidene chloride resin, a cellulose acetate resin, a fluorine resin, a polyoxymethylene resin, a polyamide resin, a polyarylate resin, a thermoplastic polyurethane elastomer, a polyether ether ketone resin, a polyether sulfone resin, polyethylene, polypropylene, a polycarbonate resin, polystyrene, a polystyrene maleic acid copolymer resin, a polystyrene acrylic acid copolymer resin, a polyphenylene ether resin, a polyphenylene sulfide resin, a polybutadiene resin, a polybutylene terephthalate resin, an acrylic resin, a methacrylic resin, a methylpentene resin, a polylactic acid, a polybutylene succinate resin, a butyral resin, a formal resin, polyvinyl alcohol, polyvinyl pyrrolidone, ethyl cellulose, carboxymethyl cellulose, gelatin, and copolymer resins thereof.

<Polymerizable Compound>

Examples of the polymerizable compound include an epoxy-based monomer, an acrylic monomer, and an oxetanyl-based monomer, and among these, an epoxy-based monomer and an acrylic monomer are preferable.

In the present invention, a polymerizable liquid crystal compound may be used as the polymerizable compound.

(Epoxy-Based Monomer)

Examples of the epoxy group-containing monomer which is an epoxy-based monomer include a bisphenol A epoxy resin, a bisphenol F epoxy resin, a brominated bisphenol A epoxy resin, a bisphenol S epoxy resin, a diphenyl ether epoxy resin, a hydroquinone epoxy resin, a naphthalene epoxy resin, a biphenyl epoxy resin, a fluorene epoxy resin, a phenol novolak epoxy resin, an orthocresol novolak epoxy resin, a trishydroxyphenylmethane epoxy resin, a trifunctional epoxy resin, a tetraphenylolethane epoxy resin, a dicylopentadiene phenol epoxy resin, a hydrogenated bisphenol A epoxy resin, a bisphenol A nucleus-containing polyol epoxy resin, a polypropylene glycol epoxy resin, a glycidyl ester epoxy resin, a glycidylamine epoxy resin, a glyoxal epoxy resin, an alicyclic epoxy resin, and a heterocyclic epoxy resin.

(Acrylic Monomer)

Examples of the acrylate monomer and the methacrylate monomer, which are acrylic monomers, include trifunctional monomers such as trimethylolpropane triacrylate, trimethylolpropane propylene oxide (PO)-modified triacrylate, trimethylolpropane ethylene oxide (EO)-modified triacrylate, trimethylolpropane trimethacrylate, and pentaerythritol triacrylate. The examples further include tetrafunctional or higher-functional monomers or oligomers such as pentaerythritol tetraacrylate, pentaerythritol tetramethacrylate, dipentaerythritol pentaacrylate, dipentaerythritol pentamethacrylate, dipentaerythritol hexaacrylate, and dipentaerythritol hexamethacrylate.

(Polymerizable Liquid Crystal Compound)

The polymerizable liquid crystal compound is not particularly limited, and for example, a compound in which any one of homeotropic alignment, homogeneous alignment, hybrid alignment, or cholesteric alignment can be performed can be used.

Here, in general, liquid crystal compounds can be classified into a rod-like type and a disk-like type according to the shape thereof. Furthermore, each type includes a low molecular type and a high molecular type. The term high molecular generally refers to a compound having a degree of polymerization of 100 or greater (Polymer Physics-Phase Transition Dynamics, written by Masao Doi, p. 2, published by Iwanami Shoten, 1992). In the present invention, any liquid crystal compound can be used, and a rod-like liquid crystal compound (hereinafter, also abbreviated as "CLC") or a discotic liquid crystal compound (disk-like liquid crystal compound) (hereinafter, also abbreviated as "DLC") is preferably used. In addition, a liquid crystal compound which is a monomer or has a relatively low molecular weight with a degree of polymerization of less than 100 is preferably used.

Specific examples of the polymerizable group of the polymerizable liquid crystal compound include an acryloyl group, a methacryloyl group, an epoxy group, and a vinyl group.

By polymerizing such a polymerizable liquid crystal compound, the alignment of the liquid crystal compound can be fixed. After fixing of the liquid crystal compound by polymerization, it is no longer necessary to exhibit liquid crystallinity.

As the rod-like liquid crystal compound, for example, those described in claim 1 of JP1999-513019A (JP-H11-513019A) or paragraphs [0026] to [0098] of JP2005-289980A can be preferably used, and as the discotic liquid crystal compound, for example, those described in paragraphs [0020] to [0067] of JP2007-108732A or paragraphs [0013] to [0108] of JP2010-244038A can be preferably used. However, the examples thereof are not limited thereto.

In the present invention, a liquid crystal compound having reciprocal wavelength dispersibility can be used as the above-described polymerizable liquid crystal compound.

Here, in this specification, the liquid crystal compound having "reciprocal wavelength dispersibility" refers to the fact that in the measurement of an in-plane retardation (Re) value at a specific wavelength (visible light range) of a retardation film produced using the liquid crystal compound, as the measurement wavelength increases, the Re value is the same or increased.

The liquid crystal compound having reciprocal wavelength dispersibility is not particularly limited as long as a film having reciprocal wavelength dispersibility can be formed as described above, and for example, compounds represented by Formula (I) described in JP2008-297210A (particularly, compounds described in paragraphs [0034] to [0039]), compounds represented by Formula (1) described in JP2010-084032A (particularly, compounds described in paragraphs [0067] to [0073]), compounds represented by Formula (II) described in JP2016-053709A (particularly, compounds described in paragraphs [0036] to [0043]), and compounds represented by Formula (1) described in JP2016-081035A (particularly, compounds described in paragraphs [0043] to [0055]) can be used.

[Polymerization Initiator]

The polymerization initiator contained in the binder composition according to the embodiment of the present invention is not particularly limited, and examples thereof include a thermal polymerization initiator and a photopolymerization initiator depending on the method of a polymerization reaction.

In the present invention, the polymerization initiator is preferably a photopolymerization initiator capable of starting a polymerization reaction by ultraviolet irradiation.

Examples of the photopolymerization initiator include a-carbonyl compounds (described in U.S. Pat. Nos. 2,367,661A and 2,367,670A), acyloin ethers (described in U.S. Pat. No. 2,448,828A), a-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimer and p-aminophenyl ketone (described in U.S. Pat. No. 3,549,367A), acridine and phenazine compounds (described in JP1985-105667A (JP-S60-105667A) and US4239850A), oxadiazole compounds (described in U.S. Pat. No. 4,212,970A), and acylphosphine oxide compounds (described in JP1988-040799B (JP-S63-040799B), JP1993-029234B (JP-H05-029234B), JP1998-095788A (JP-H10-095788A), and JP1998-029997A (JP-H10-029997A)).

[Surfactant]

The surfactant contained in the binder composition according to the embodiment of the present invention is a surfactant having a functional group capable of hydrogen bonding with a functional group of the photo-alignment agent to be described later.

As described above, the functional group capable of hydrogen bonding included in any one of the surfactant or the photo-alignment agent to be described later is a proton-donating functional group, and the functional group included in the other of the surfactant or the photo-alignment agent is a proton-accepting functional group.

In the present invention, the surfactant is preferably a low-molecular-weight compound or an oligomer since the upper layer coatability is further improved. The reason for this is thought to be that the surfactant is more easily transferred to the coating liquid of the upper layer.

Here, the molecular weight of the low-molecular-weight compound or the oligomer is preferably 100 to 8,000, more preferably 200 to 5,000, and even more preferably 300 to 3,000.

In the present invention, the surfactant is preferably a compound represented by any one of Formula (1-1), Formula (1-2), or Formula (1-3) since the upper layer coatability is further improved. The reason for this is thought to be that the surfactant is more easily transferred to the coating liquid of the upper layer.

　　(1-1)

　　(1-2)

　　(1-3)

In Formulae (1-1) and (1-3), m represents an integer of 1 to 5, and in Formulae (1-1) and (1-2), n represents 1 to 5. Here, the sum of m and n represents an integer of 2 to 6.

In Formulae (1-1) to (1-3), HB represents the functional group capable of hydrogen bonding described above. In a case where m is an integer of 2 to 5, a plurality of HB's may be the same as or different from each other.

In Formulae (1-1) to (1-3), $X^1$ and $X^2$ each independently represent a single bond or a divalent linking group. In a case where m is an integer of 2 to 5, a plurality of $X^1$'s may be the same as or different from each other, and in a case where n is an integer of 2 to 5, a plurality of $X^2$'s may be the same as or different from each other.

In Formula (1-2), regarding HB and $X^2$, a ring may be formed with HB and a part of $X^2$. In Formula (1-3), regarding RL and $X^1$, a ring may be formed with RL and a part of $X^1$.

Examples of the divalent linking group represented by one aspect of $X^1$ and $X^2$ in Formulae (1-1) to (1-3) include at least one selected from the group consisting of a linear, branched, or cyclic alkylene group having 1 to 10 carbon atoms which may have a substituent, an arylene group having 6 to 12 carbon atoms which may have a substituent, an ether group (—O—), a carbonyl group (—C(=O)—), and an imino group (—NH—) which may have a substituent.

Here, examples of the optional substituent of the alkylene group, the arylene group, and the imino group include an alkyl group, an alkoxy group, a halogen atom, and a hydroxyl group.

As the alkyl group, for example, a linear, branched, or cyclic alkyl group having 1 to 18 carbon atoms is preferable, an alkyl group having 1 to 8 carbon atoms (for example, a methyl group, an ethyl group, a propyl group, an isopropyl group, an N-butyl group, an isobutyl group, a sec-butyl group, a t-butyl group, and a cyclohexyl group) is more preferable, an alkyl group having 1 to 4 carbon atoms is even more preferable, and a methyl group or an ethyl group is particularly preferable.

As the alkoxy group, for example, an alkoxy group having 1 to 18 carbon atoms is preferable, an alkoxy group having 1 to 8 carbon atoms (for example, a methoxy group, an ethoxy group, an n-butoxy group, and a methoxyethoxy group) is more preferable, an alkoxy group having 1 to 4 carbon atoms is even more preferable, and a methoxy group or an ethoxy group is particularly preferable.

Examples of the halogen atom include a fluorine atom, a chlorine atom, a bromine atom, and an iodine atom, and among these, a fluorine atom and a chlorine atom are preferable.

Regarding the linear, branched, or cyclic alkylene group having 1 to 10 carbon atoms, specific examples of the linear alkylene group include a methylene group, an ethylene group, a propylene group, a butylene group, a pentylene group, a hexylene group, and a decylene group.

Specific examples of the branched alkylene group include a dimethylmethylene group, a methylethylene group, a 2,2-dimethylpropylene group, and a 2-ethyl-2-methylpropylene group.

Specific examples of the cyclic alkylene group include a cyclopropylene group, a cyclobutylene group, a cyclopentylene group, a cyclohexylene group, a cyclooctylene group, a cyclodecylene group, an adamantane-diyl group, a norbornane-diyl group, and an exo-tetrahydrodicyclopentadiene-diyl group.

Specific examples of the arylene group having 6 to 12 carbon atoms include a phenylene group, a xylylene group, a biphenylene group, a naphthylene group, and a 2,2'-methylenebisphenyl group. Among these, a phenylene group is preferable.

In Formula (1-1), $X^3$ represents a single bond or a divalent to hexavalent linking group.

Here, examples of the divalent linking group represented by one aspect of $X^3$ include those described as the divalent linking group represented by one aspect of $X^1$ and $X^2$ in Formulae (1-1) to (1-3).

Examples of the trivalent to hexavalent linking group represented by one aspect of $X^3$ include a structure in which 3 to 6 hydrogen atoms bonded with carbon atoms forming a ring are removed in the ring structure such as: a cycloalkylene ring such as a cyclohexane ring or a cyclohexene ring; an aromatic hydrocarbon ring such as a benzene ring, a naphthalene ring, an anthracene ring, or a phenanthroline ring; or an aromatic heterocyclic ring such as a furan ring, a pyrrole ring, a thiophene ring, a pyridine ring, a thiazole ring, or a benzothiazole ring. Among these ring structures, a benzene ring (for example, a benzene-1,2,4-yl group) is preferable.

In Formulae (1-1) to (1-3), RL represents a substituent containing a fluorine atom or a silicon atom or an alkyl group having 6 or more carbon atoms. In a case where n is an integer of 2 to 5, a plurality of RL's may be the same as or different from each other.

Here, examples of the monovalent substituent containing a fluorine atom or a silicon atom include an alkyl group having 1 to 20 carbon atoms or an alkenyl group having 2 to 20 carbon atoms, in which at least one carbon atom has a fluorine atom as a substituent.

Specific examples of the compound having a proton-donating functional group among the compounds represented by any one of Formulae (1-1) to (1-3) include a compound represented by any one of the following formulae.

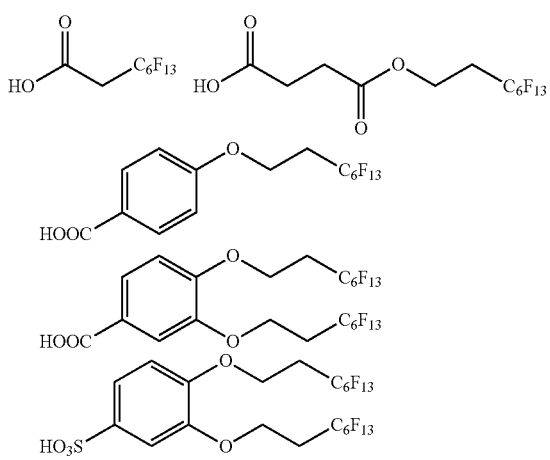

Specific examples of the compound having a proton-accepting functional group among the compounds represented by any one of Formulae (1-1) to (1-3) include a compound represented by any one of the following formulae.

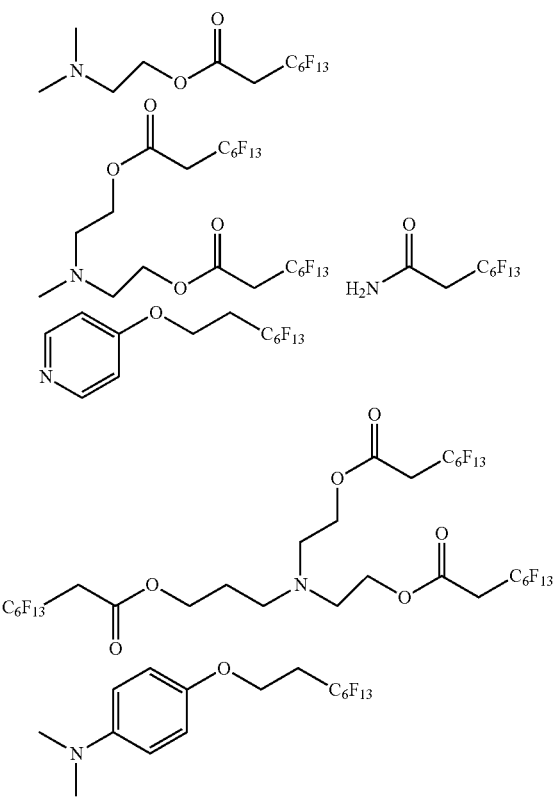

In the present invention, the content of the surfactant is not particularly limited, and is preferably 0.01 to 10.0 parts by mass, and more preferably 0.1 to 5.0 parts by mass with respect to 100 parts by mass of the binder.

[Photo-Alignment Agent]

The photo-alignment agent contained in the binder composition according to the embodiment of the present invention is a photo-alignment agent having a functional group capable of hydrogen bonding with the functional group of the surfactant described above.

As described above, the functional group capable of hydrogen bonding in any one of the photo-alignment agent or the surfactant described above is a proton-donating functional group, and the functional group in the other is a proton-accepting functional group.

In the present invention, the photo-alignment agent is preferably an oligomer or a polymer compound since the liquid crystal aligning properties are further improved.

Here, the weight-average molecular weight of the oligomer or the polymer compound is preferably 3,000 to 700,000, more preferably 5,000 to 500,000, and even more preferably 7,000 to 200,000.

The weight-average molecular weight is a value measured by gel permeation chromatography (GPC) under the following conditions.

[Eluent] Tetrahydrofuran (THF)

[Device Name] Ecosec HLC-8220GPC (manufactured by Tosoh Corporation)

[Column] TSKgel SuperHZM-H, TSKgel SuperHZ4000, TSKgel SuperHZM200 (manufactured by Tosoh Corporation)

[Column Temperature] 40° C.

[Flow Rate] 50 ml/min

In the present invention, since the liquid crystal aligning properties are further improved, the photo-alignment agent is preferably a polymer having a repeating unit represented by any one of Formula (2-1), Formula (2-2), or Formula (2-3), or a polymer having a repeating unit represented by any one of Formula (3-1), Formula (3-2), or Formula (3-3).

Among these, a polymer having a repeating unit represented by Formula (2-1) or a polymer having a repeating unit represented by Formula (3-1) is more preferable.

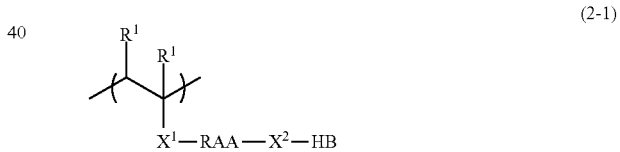

(2-1)

(3-1)

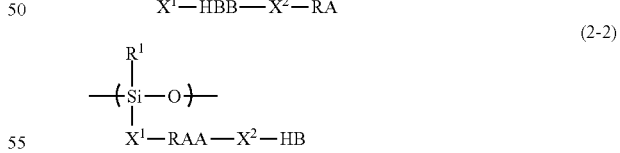

(2-2)

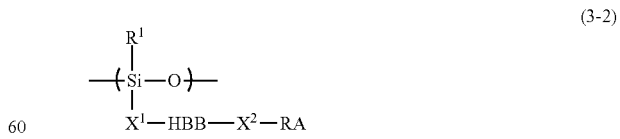

(3-2)

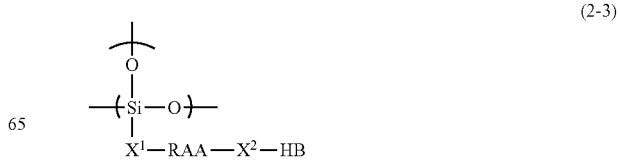

(2-3)

-continued

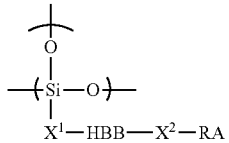
(3-3)

In Formulae (2-1), (2-2), (3-1), and (3-2), $R^1$ represents a hydrogen atom or an alkyl group having 1 to 3 carbon atoms, and a plurality of $R^1$'s in Formulae (2-1) and (3-1) may be the same as or different from each other.

$R^1$ is preferably a hydrogen atom or a methyl group.

In Formulae (2-1) to (2-3) and (3-1) to (3-3), $X^1$ and $X^2$ each independently represent a single bond or a divalent linking group.

Here, examples of the divalent linking group include those described as the divalent linking group represented by one aspect of $X^1$ and $X^2$ in Formulae (1-1) to (1-3).

In Formulae (2-1) to (2-3), RAA represents a divalent linking group containing a photo-alignment group, and HB represents the functional group capable of hydrogen bonding described above.

In Formulae (3-1) to (3-3), HBB represents a divalent linking group containing the functional group capable of hydrogen bonding described above, and RA represents a photo-alignment group.

Here, the photo-alignment group refers to a group having a photo-alignment function in which rearrangement or an anisotropic chemical reaction is induced by irradiation with light having anisotropy (for example, plane-polarized light). For excellent alignment uniformity and improved thermal stability and chemical stability, a photo-alignment group in which at least one of dimerization or isomerization is caused by the action of light is preferable.

Specific suitable examples of the photo-alignment group which is dimerized by the action of light include groups having a skeleton of at least one type of derivative selected from the group consisting of cinnamic acid derivatives (M. Schadt et al., J. Appl. Phys., vol. 31, No. 7, page 2155 (1992)), coumarin derivatives (M. Schadt et al., Nature, vol. 381, page 212 (1996)), chalcone derivatives (Toshihiro Ogawa et al., Preprints of Symposium on Liquid Crystals (Ekisho Toronkai Koen Yokoshu in Japanese), 2AB03 (1997)), maleimide derivatives, and benzophenone derivatives (Y. K. Jang et al., SID Int. Symposium Digest, P-53 (1997)).

Specific suitable examples of the photo-alignment group which is isomerized by the action of light include groups having a skeleton of at least one type of compound selected from the group consisting of azobenzene compounds (K. Ichimura et al., Mol. Cryst. Liq. Cryst., 298, 221 (1997)), stilbene compounds. (J. G. Victor and J. M. Torkelson, Macromolecules, 20, 2241 (1987)), spiropyran compounds (K. Ichimura et al., Chemistry Letters, page 1063 (1992); K. Ichimura et al., Thin Solid Films, vol. 235, page 101 (1993)), cinnamic acid compounds (K. Ichimura et al., Macromolecules, 30, 903 (1997)), and hydrazono-β-ketoester compounds (S. Yamamura et al., Liquid Crystals, vol. 13, No. 2, page 189 (1993)).

Among these, as the photo-alignment group, a group having a skeleton of at least one type of derivative selected from the group consisting of cinnamic acid derivatives, coumarin derivatives, chalcone derivatives, maleimide derivatives, azobenzene compounds, stilbene compounds, and spiropyran compounds is preferable, and a group having a skeleton of a cinnamic acid derivative or a coumarin derivative is more preferable.

Examples of the polymer having a repeating unit represented by Formula (2-1) include a polymer represented by any one of the following formulae.

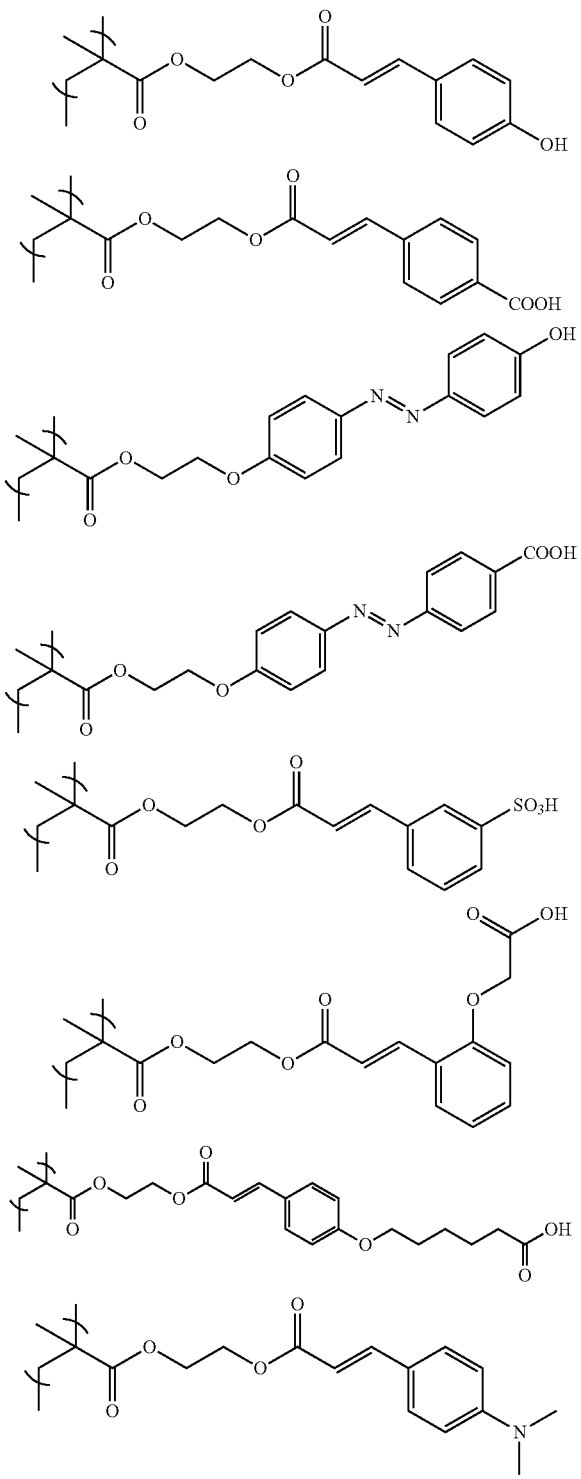

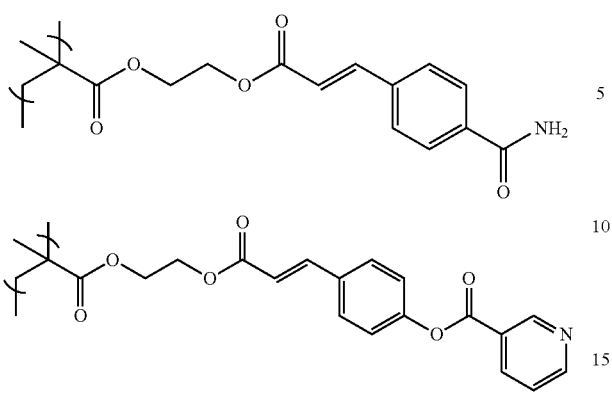

Examples of the polymer having a repeating unit represented by Formula (3-1) include a polymer represented by any one of the following formulae.

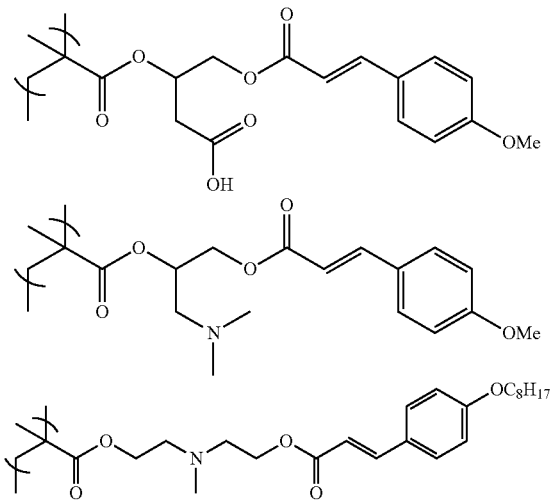

In the present invention, since the liquid crystal aligning properties are improved, the photo-alignment agent is preferably a copolymer having a repeating unit represented by any one of Formula (4-1-1), Formula (4-1-2), or Formula (4-1-3) and a repeating unit represented by any one of Formula (4-2-1), Formula (4-2-2), or Formula (4-2-3).

Among these, a copolymer having a repeating unit represented by Formula (4-1-1) and a repeating unit represented by Formula (4-2-1) is more preferable.

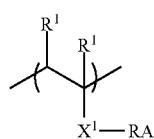

(4-1-1)

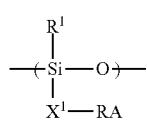

(4-1-2)

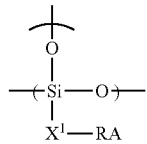

(4-1-3)

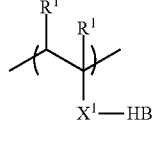

(4-2-1)

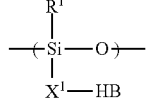

(4-2-2)

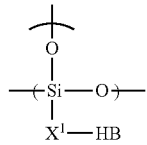

(4-2-3)

In Formulae (4-1-1), (4-1-2), (4-2-1), and (4-2-2), $R^1$ represents a hydrogen atom or an alkyl group having 1 to 3 carbon atoms. A plurality of $R^1$'s in Formulae (4-1-1) and (4-2-1) may be the same as or different from each other.

$R^1$ is preferably a hydrogen atom or a methyl group.

In Formulae (4-1-1) to (4-1-3) and (4-2-1) to (4-2-3), $X^1$ represents a single bond or a divalent linking group.

Here, examples of the divalent linking group include those described as the divalent linking group represented by one aspect of $X^1$ and $X^2$ in Formulae (1-1) to (1-3).

In Formulae (4-1-1) to (4-1-3), RA represents a photo-alignment group, and in Formulae (4-2-1) to (4-2-3), HB represents the functional group capable of hydrogen bonding described above.

Here, the photo-alignment group is the same as the photo-alignment group represented by RA in Formulae (3-1) to (3-3).

Examples of the copolymer having a repeating unit represented by Formula (4-1-1) and a repeating unit represented by Formula (4-2-1) include a copolymer represented by any one of the following formulae.

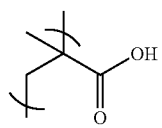

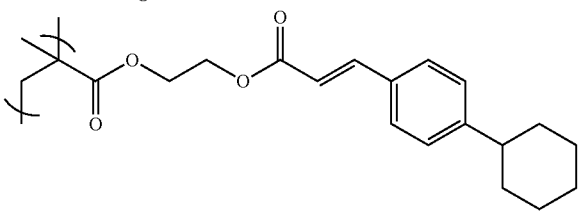

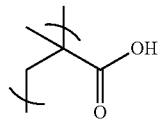

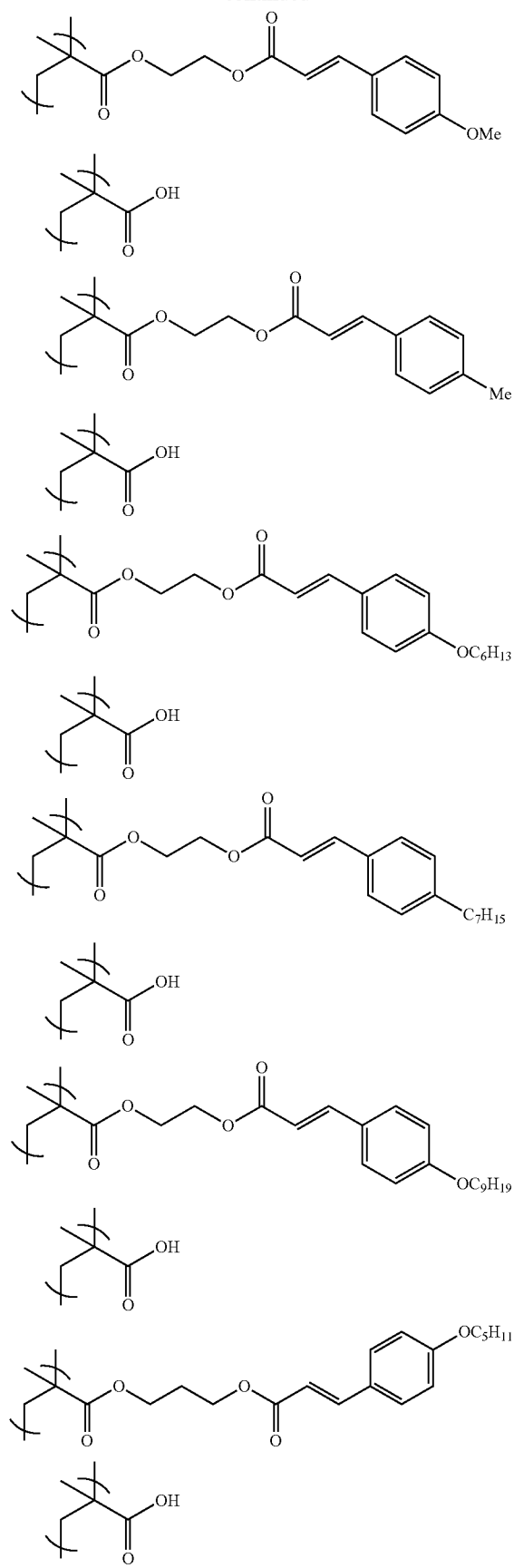
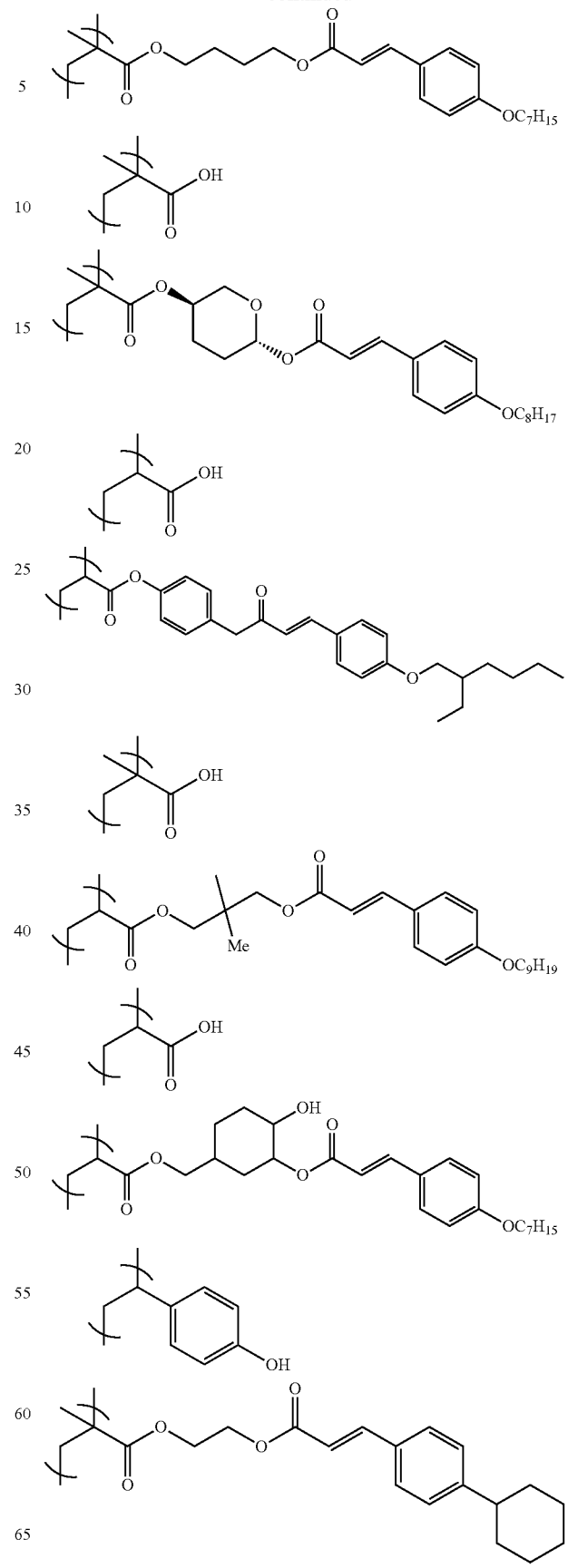

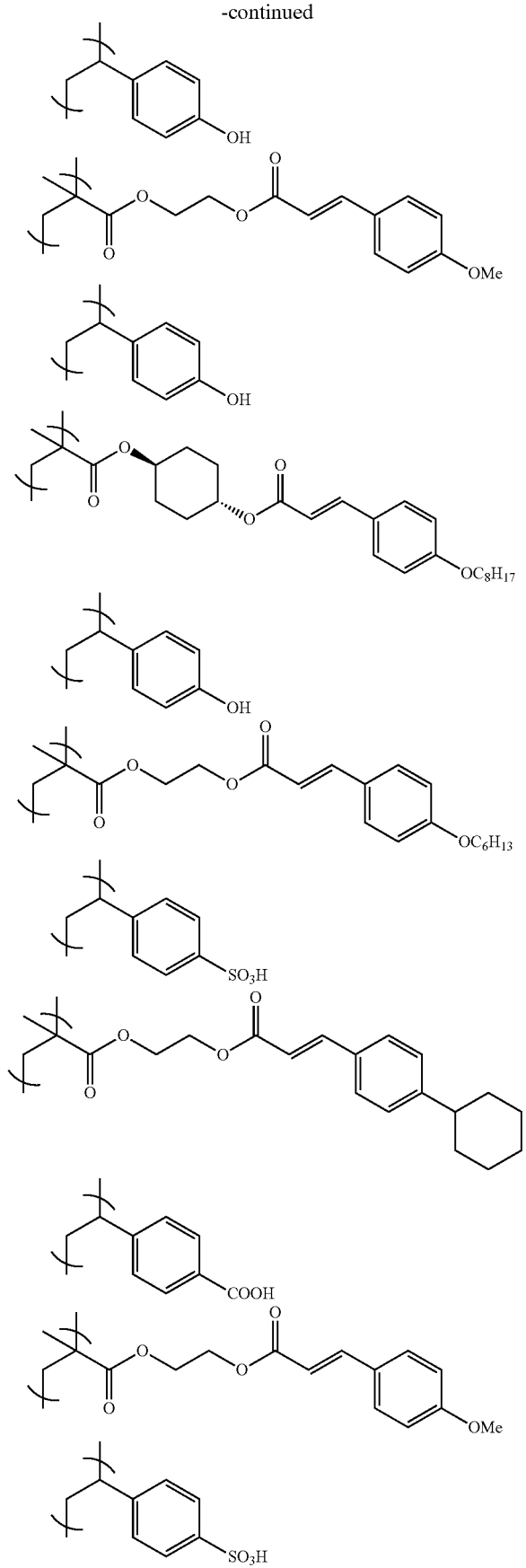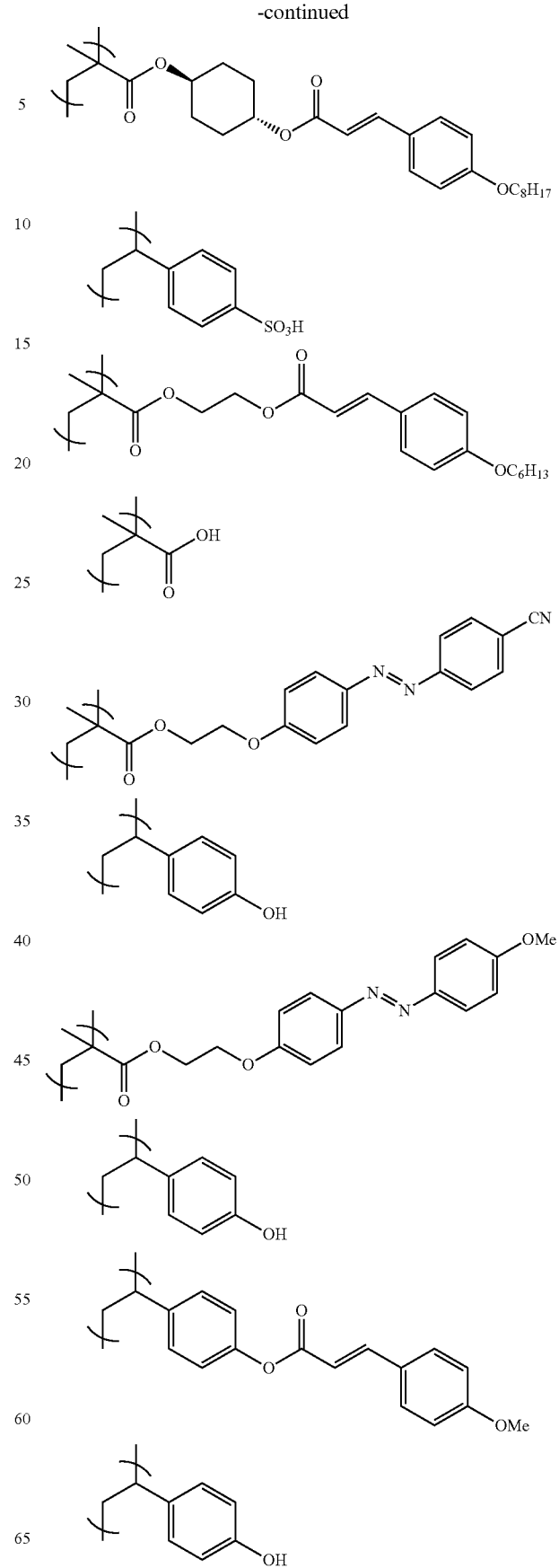

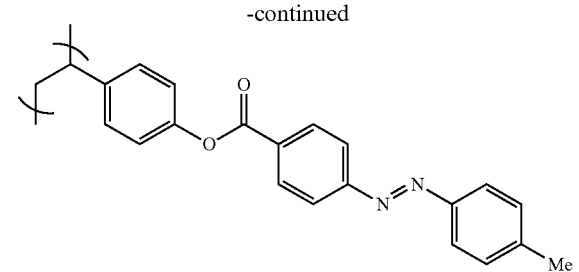
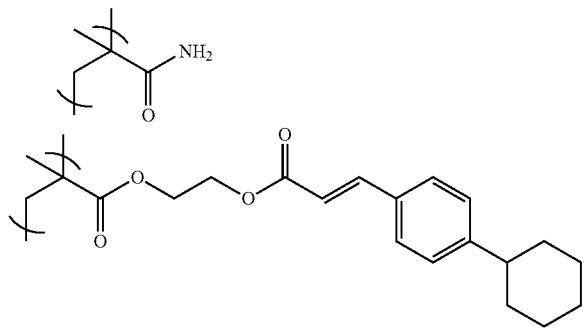
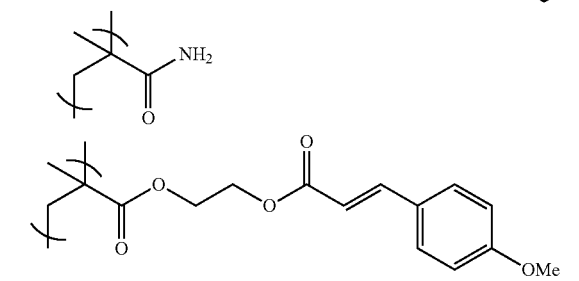
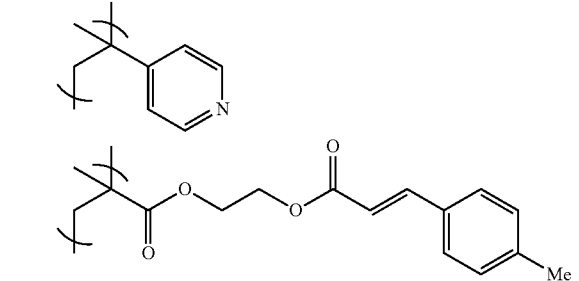
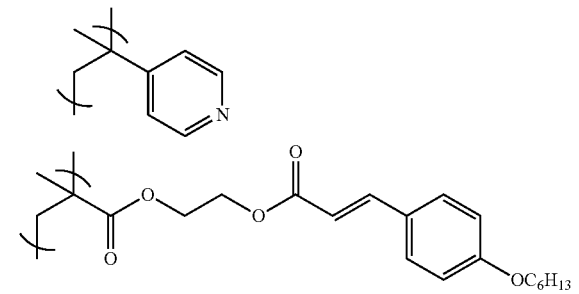
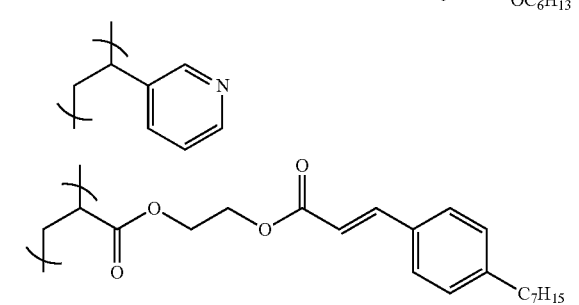
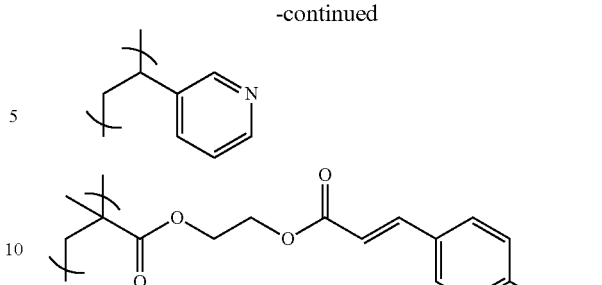
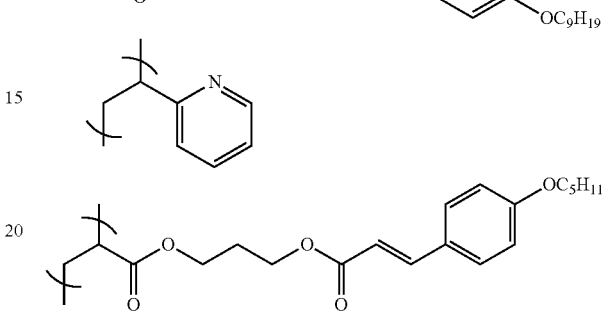
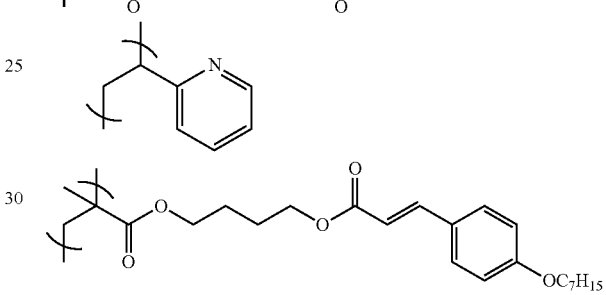
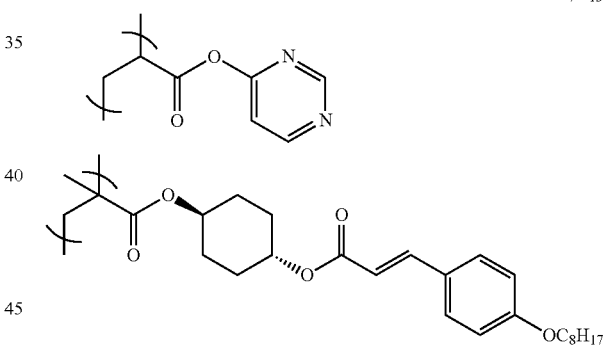
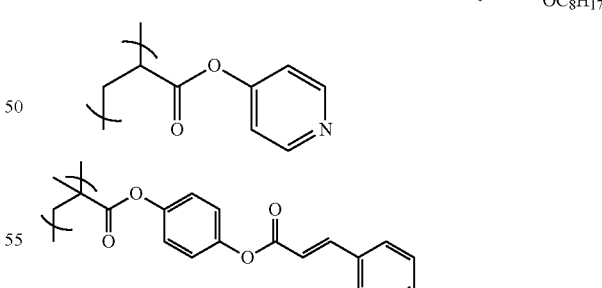
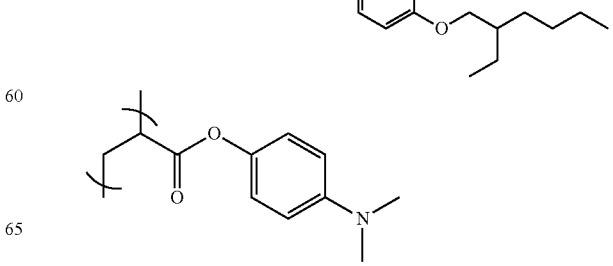

-continued

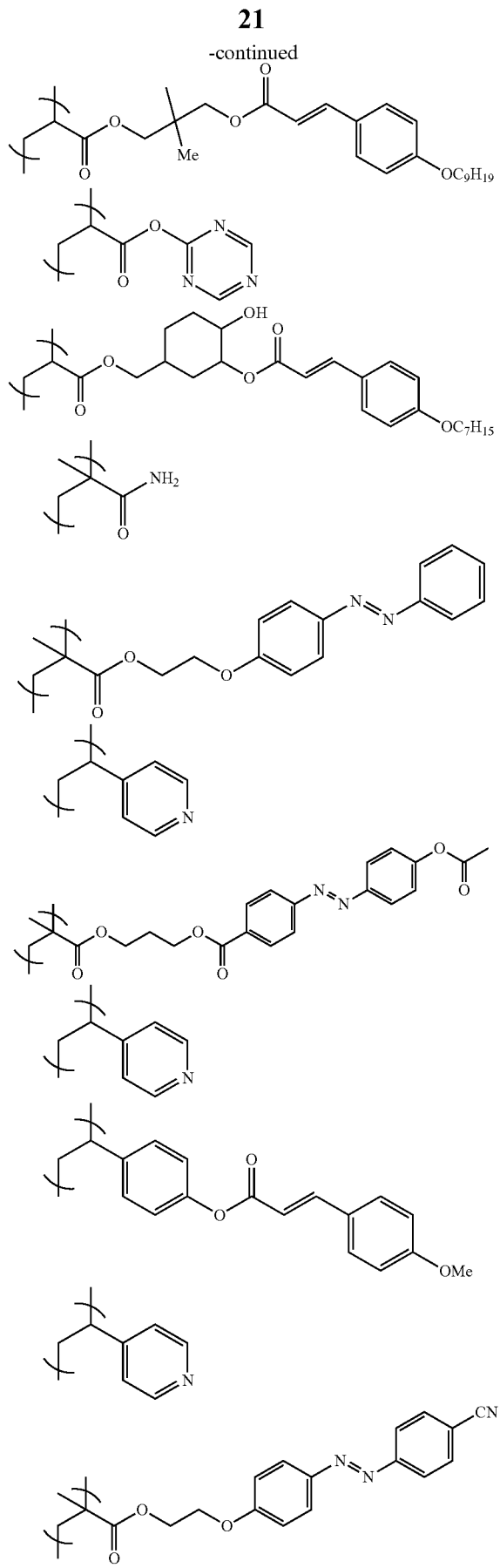

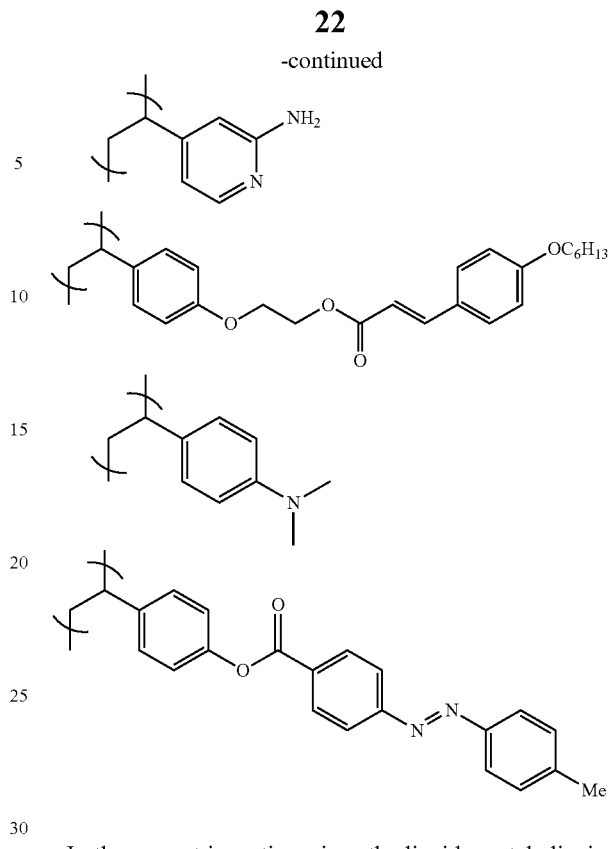

In the present invention, since the liquid crystal aligning properties are improved, the photo-alignment agent is preferably a polymer having a repeating unit represented by any one of Formula (5-1), Formula (5-2), or Formula (5-3).

Among these, a polymer having a repeating unit represented by Formula (5-1) is more preferable.

(5-1)

(5-2)

(5-3)

In Formulae (5-1) and (5-2), $R^1$ represents a hydrogen atom or an alkyl group having 1 to 3 carbon atoms, and a plurality of $R^1$'s in Formula (5-1) may be the same as or different from each other.

$R^1$ is preferably a hydrogen atom or a methyl group.

In Formulae (5-1) to (5-3), $X^1$ represents a single bond or a divalent linking group.

Here, examples of the divalent linking group include those described as the divalent linking group represented by one aspect of $X^1$ and $X^2$ in Formulae (1-1) to (1-3).

In Formulae (5-1) to (5-3), RAB represents a substituent having both a photo-alignment group and a functional group capable of hydrogen bonding.

Examples of the polymer having a repeating unit represented by Formula (5-1) include a polymer represented by any one of the following formulae.

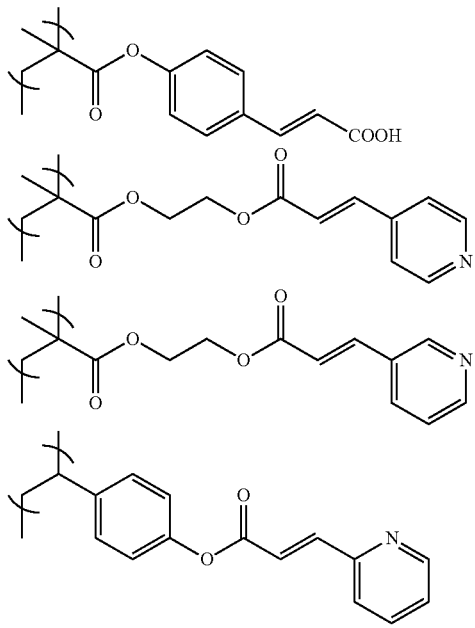

In the present invention, the content of the photo-alignment agent is not particularly limited, and is preferably 0.1 to 10 parts by mass, and more preferably 0.5 to 5 parts by mass with respect to 100 parts by mass of the binder.

[Solvent]

The binder composition according to the embodiment of the present invention preferably contains a solvent from the viewpoint of workability or the like for forming a binder layer.

Specific examples of the solvent include ketones (for example, acetone, 2-butanone, methyl isobutyl ketone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, toluene, xylene, and trimethylbenzene), halogenated carbons (for example, dichloromethane, dichloroethane, dichlorobenzene, and chlorotoluene), esters (for example, methyl acetate, ethyl acetate, and butyl acetate), water, alcohols (for example, ethanol, isopropanol, butanol, and cyclohexanol), cellosolves (for example, methyl cellosolve and ethyl cellosolve), cellosolve acetates, sulfoxides (for example, dimethyl sulfoxide), and amides (for example, dimethylformamide and dimethylacetamide). These may be used alone or in combination of two or more types thereof.

[Binder Layer]

A binder layer according to the embodiment of the present invention is a layer formed using the above-described binder composition according to the embodiment of the present invention.

The method of forming the binder layer is not particularly limited since it differs depending on the type of the binder, and in a case where a polymerizable compound is used as the binder, the layer can be formed by a method which has been known, such as photocationic polymerization or radical polymerization.

[Photo-Acid Generator/Thermal Acid Generator]

In a case where the binder composition according to the embodiment of the present invention has a functional group such as epoxy or oxetane which is polymerized with an acid, the binder layer according to the embodiment of the present invention may contain a photo-acid generator or a thermal acid generator. As the photo-acid generator or the thermal acid generator, a known photo-acid generator or thermal acid generator can be appropriately used.

The photo-acid generator is preferably a compound which is sensitive to actinic rays having a wavelength of 300 nm or more, preferably 300 to 450 nm, and generates an acid, and is not limited to a chemical structure thereof. A photo-acid generator which is not directly sensitive to actinic rays having a wavelength of 300 nm or more can also be preferably used in combination with a sensitizer as long as it is a compound which is sensitive to actinic rays having a wavelength of 300 nm or more and generates an acid by being used in combination with the sensitizer. The photo-acid generator used in the present invention is preferably a photo-acid generator which generates an acid with a pKa of 4 or less, more preferably a photo-acid generator which generates an acid with a pKa of 3 or less, and most preferably a photo-acid generator which generates an acid with a pKa of 2 or less. In the present invention, the pKa basically refers to a pKa in water at 25° C. Those which cannot be measured in water refer to those measured after changing to a solvent suitable for the measurement. Specifically, the pKa described in a chemical handbook or the like can be referred to. The acid with a pKa of 3 or less is preferably a sulfonic acid or a phosphonic acid, and more preferably a sulfonic acid.

Examples of the photo-acid generator include an onium salt compound, trichloromethyl-s-triazines, a sulfonium salt, an iodonium salt, a quaternary ammonium salt, a diazomethane compound, an imidosulfonate compound, and an oxime sulfonate compound. Among these, an onium salt compound, an imidosulfonate compound, and an oxime sulfonate compound are preferable, and an onium salt compound and an oxime sulfonate compound are particularly preferable. The photo-acid generators can be used alone or in combination of two or more types thereof.

The thermal acid generator is not particularly limited as long as it is a compound which releases an acid by heat. Examples thereof include known thermal acid generators such as an organic halogenated compound, a disulfonic acid compound, an oxime ester compound, a sulfonic acid ester compound, a phosphoric acid ester compound, a phosphonic acid ester compound, and an onium salt compound such as sulfonium, iodonium, diazonium, pyridinium, and ammonium.

[Optical Laminate]

An optical laminate according to the embodiment of the present invention is an optical laminate having the binder layer according to the embodiment of the present invention and an optically anisotropic layer provided on the binder layer.

In the optical laminate according to the embodiment of the present invention, the optically anisotropic layer provided on the binder layer is formed using a polymerizable liquid crystal composition containing a polymerizable liquid crystal compound. In addition, the binder layer and the optically anisotropic layer are laminated adjacent to each other.

The optical laminate according to the embodiment of the present invention preferably has a support which supports the binder layer.

Hereinafter, preferable aspects of the optical laminate according to the embodiment of the present invention will be described in detail.

[Support]

Examples of the support include a glass substrate and a polymer film.

Examples of the material of the polymer film include cellulose-based polymers; acrylic polymers having an acrylic ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing these polymers.

The thickness of the support is not particularly limited, and is preferably 5 to 200 µm, more preferably 10 to 100 µm, and even more preferably 20 to 90 µm.

[Binder Layer]

The binder layer is the above-described binder layer according to the embodiment of the present invention.

In the present invention, the thickness of the binder layer is not particularly limited, and is preferably 0.1 to 10 µm, and more preferably 0.5 to 5 µm.

[Optically Anisotropic Layer]

As described above, the optically anisotropic layer is formed using a polymerizable liquid crystal composition containing a polymerizable liquid crystal compound.

Here, examples of the polymerizable liquid crystal composition for forming the optically anisotropic layer include a composition obtained by blending the polymerizable liquid crystal compound described as an optional component in the binder composition according to the embodiment of the present invention, a polymerization initiator, a solvent, and the like.

In the present invention, the thickness of the optically anisotropic layer is not particularly limited, and is preferably 0.1 to 10 µm, and more preferably 0.5 to 5 µm.

[Method of Manufacturing Optical Laminate]

A method of manufacturing the optical laminate according to the embodiment of the present invention is a method of producing a preferable aspect of the above-described optical laminate according to the embodiment of the present invention, and has a first coating step of applying the above-described binder composition according to the embodiment of the present invention to the above-described support, a binder layer forming step of forming a binder layer after the first coating step, a light irradiation step of performing irradiation with polarized or non-polarized light, a second coating step of directly applying a polymerizable liquid crystal composition for forming an optically anisotropic layer to the binder layer, and an optically anisotropic layer forming step of forming an optically anisotropic layer after the second coating step.

In the method of manufacturing the optical laminate according to the embodiment of the present invention, the light irradiation step is a step which is performed between the binder layer forming step and the second coating step, or simultaneously with the binder layer forming step or the second coating step.

[First Coating Step]

The first coating step is a step of applying the above-described binder composition according to the embodiment of the present invention to the above-described support.

The method of performing coating with the binder composition according to the embodiment of the present invention is not particularly limited, and specific examples of the coating method include a spin coating method, an air knife coating method, a curtain coating method, a roller coating method, a wire bar coating method, a gravure coating method, and a die coating method.

[Binder Layer Forming Step]

The binder layer forming step is a step of forming a binder layer after the first coating step, and the binder layer can be formed by performing a curing treatment (irradiation with ultraviolet rays (light irradiation treatment) or heating treatment) on the coating film obtained in the first coating step.

The conditions of the curing treatment are not particularly limited, and ultraviolet rays are preferably used in polymerization by light irradiation. The irradiation dose is preferably 10 mJ/cm$^2$ to 50 J/cm$^2$, more preferably 20 mJ/cm$^2$ to 5 J/cm$^2$, even more preferably 30 mJ/cm$^2$ to 3 J/cm$^2$, and particularly preferably 50 mJ/cm$^2$ to 1,000 mJ/cm$^2$. In order to promote the polymerization reaction, the treatment may be performed under heating conditions.

[Irradiation Step]

The irradiation step is a step of performing irradiation with polarized or non-polarized light, that is, a step of imparting an alignment function.

The irradiation step is a step which is performed between the binder layer forming step and the second coating step, or simultaneously with the binder layer forming step or the second coating step from the viewpoint of securing coatability in the formation of the optically anisotropic layer as an upper layer.

Here, the expression "between the binder layer forming step and the second coating step" means that before the second coating step, the irradiation step (for example, polarized light irradiation step) is performed on the binder layer formed in the binder layer forming step (for example, thermal polymerization).

The expression "simultaneously with the binder layer forming step" means that the step of forming the binder layer, e.g., the step of forming the binder layer by the polymerization of an olefin-based monomer by photo-radical generation and the polymerization of an epoxy monomer by photo-acid generation, and the irradiation step (for example, polarized light irradiation step) are simultaneously performed. That is, this means that light which is used for polymerization of the binder layer and light which is used for alignment cause two actions simultaneously.

The expression "simultaneously with the second coating step" means that the irradiation step (for example, polarized light irradiation step) is performed at the same time when the second coating step is performed on the binder layer formed in the binder layer formation step (for example, photopolymerization).

The irradiation step is preferably performed between the binder layer forming step and the second coating step.

Preferable examples of the irradiation method include a method of polarizing and applying ultraviolet rays, and specific examples thereof include a method using a polarizing plate (for example, an iodine polarizing plate, a dichroic dye polarizing plate, and a wire grid polarizing plate); a method using a prism-based element (for example, a Glan-Thompson prism) or a reflective-type polarizer using the Brewster angle; and a method using light emitted from a laser light source having polarized light.

Here, the light source used for ultraviolet irradiation is not particularly limited as long as it is a light source which generates ultraviolet rays. For example, a low pressure mercury lamp, a medium pressure mercury lamp, a high pressure mercury lamp, an ultra-high pressure mercury lamp, a carbon arc lamp, a metal halide lamp, a xenon lamp, or the like can be used.

[Second Coating Step]

The second coating step is a step of directly applying a polymerizable liquid crystal composition for forming an optically anisotropic layer to the binder layer.

The method of applying the polymerizable liquid crystal composition for forming an optically anisotropic layer is not particularly limited, and examples thereof include a method same as the first coating step.

[Optically Anisotropic Layer Forming Step)

The optically anisotropic layer forming step is a step of forming an optically anisotropic layer after the second coating step. The optically anisotropic layer can be formed by performing a curing treatment (irradiation with ultraviolet rays (light irradiation treatment) or heating treatment) on the coating film obtained in the second coating step.

The conditions of the curing treatment are not particularly limited, and ultraviolet rays are preferably used in polymerization by light irradiation. The irradiation dose is preferably 10 mJ/cm$^2$ to 50 J/cm$^2$, more preferably 20 mJ/cm$^2$ to 5 J/cm$^2$, even more preferably 30 mJ/cm$^2$ to 3 J/cm$^2$, and particularly preferably 50 mJ/cm$^2$ to 1,000 mJ/cm$^2$. In order to promote the polymerization reaction, the treatment may be performed under heating conditions.

[Image Display Device]

An image display device according to the embodiment of the present invention is an image display device having the optically anisotropic layer according to the present invention or the optical laminate according to the embodiment of the present invention.

The display element which is used in the image display device according to the embodiment of the present invention is not particularly limited, and examples thereof include a liquid crystal cell, an organic electroluminescence (hereinafter, electroluminescence "EL") display panel, and a plasma display panel.

Among these, a liquid crystal cell or an organic EL display panel is preferable, and a liquid crystal cell is more preferable. That is, the image display device according to the embodiment of the present invention is preferably a liquid crystal display device using a liquid crystal cell as a display element or an organic EL display device using an organic EL display panel as a display element.

[Liquid Crystal Display Device]

A liquid crystal display device as an example of the image display device according to the embodiment of the present invention is a liquid crystal display device having the optically anisotropic layer according to the present invention or the optical laminate according to the embodiment of the present invention described above, and a liquid crystal cell.

Hereinafter, the liquid crystal cell of the liquid crystal display device will be described in detail.

<Liquid Crystal Cell>

The liquid crystal cell which is used in the liquid crystal display device is preferably a vertical alignment (VA) mode, an optically compensated bend (OCB) mode, an in-plane-switching (IPS) mode, or a twisted nematic (TN) mode, but is not limited thereto.

In a TN mode liquid crystal cell, rod-like liquid crystalline molecules (rod-like liquid crystal compound) are substantially horizontally aligned with no voltage application thereto, and subjected to twist alignment of 60° to 120°. The TN mode liquid crystal cell is the most frequently used as a color TFT liquid crystal display device, and there are descriptions in many literatures.

In a VA mode liquid crystal cell, rod-like liquid crystalline molecules are substantially vertically aligned with no voltage application thereto. The VA mode liquid crystal cell may be any one of (1) a VA mode liquid crystal cell in the narrow sense in which rod-like liquid crystalline molecules are substantially vertically aligned with no voltage application thereto, but are substantially horizontally aligned in the presence of voltage application thereto (described in JP1990-176625A (JP-112-176625A)); (2) a (multi-domain vertical alignment (MVA) mode) liquid crystal cell attaining multi-domain of the VA mode for view angle enlargement (described in SID97, Digest of tech. Papers (proceedings) 28 (1997), 845), (3) an (n-axially symmetric aligned microcell (ASM) mode) liquid crystal cell in which rod-like liquid crystalline molecules are substantially vertically aligned with no voltage application thereto, but are subjected to twist multi-domain alignment in the presence of voltage application thereto (described in proceedings of Japan Liquid Crystal Debating Society, 58 to 59 (1998)), and (4) a super ranged viewing by vertical alignment (SURVIVAL) mode liquid crystal cell (published in liquid crystal display (LCD) International 98). In addition, the VA mode liquid crystal cell may be any one of a patterned vertical alignment (PVA) type, an optical alignment type, and a polymer-sustained alignment (PSA) type. The details of the modes are described in JP2006-215326A and JP2008-538819A.

In an IPS mode liquid crystal cell, rod-like liquid crystalline molecules are aligned substantially parallel to the substrate, and the liquid crystalline molecules respond planarly with application of an electric field parallel to the substrate surface. In the IPS mode, black display is performed during application of no electric field, and the absorption axes of a pair of upper and lower polarizing plates are perpendicular to each other. A method of improving a view angle by reducing light leakage at the time of black display in an oblique direction by using an optical compensation sheet is disclosed in JP1998-054982A (JP-H10-054982A), JP1999-202323A (JP-H11-202323A), JP1997-292522A (JP-1109-292522A), JP1999-133408A (JP-H11-133408A), JP1999-305217A (JP-H11-305217A), JP1998-307291A (JP-H10-307291A), and the like.

[Organic EL Display Device]

Suitable examples of the organic EL display device as an example of the image display device according to the embodiment of the present invention include a device having an aspect in which it has a polarizer, the optically anisotropic layer according to the present invention or the optical laminate according to the embodiment of the present invention, and an organic EL display panel in this order from the viewing side.

<Polarizer>

The polarizer is not particularly limited as long as it is a member having a function of converting light into specific linearly polarized light. An absorption-type polarizer or a reflection-type polarizer which has been known can be used.

As the absorption-type polarizer, an iodine-based polarizer, a dye-based polarizer using a dichroic dye, a polyene-based polarizer, or the like is used. Iodine-based polarizers and dye-based polarizers include coating-type polarizers and stretching-type polarizers, and any of them can be applied. A polarizer produced by adsorbing iodine or a dichroic dye to polyvinyl alcohol and performing stretching is preferable.

Examples of the method of obtaining a polarizer by performing stretching and dyeing in a state in which a lamination film is obtained by forming a polyvinyl alcohol layer on a base include JP5048120B, JP5143918B, JP4691205B, JP4751481B, and JP4751486B, and known techniques related to these polarizers can also be preferably used.

As the reflection-type polarizer, a polarizer obtained by laminating thin films having different birefringences, a wire grid-type polarizer, a polarizer obtained by combining a cholesteric liquid crystal having a selective reflection area and a ¼ wavelength plate, or the like is used.

Among these, in view of more excellent adhesiveness, a polarizer including a polyvinyl alcohol-based resin (a polymer containing —CH$_2$—CHOH— as a repeating unit, particularly, at least one selected from the group consisting of a polyvinyl alcohol and an ethylene-vinyl alcohol copolymer) is preferable.

Particularly, a polarizer containing at least one kind selected from the group consisting of polyvinyl alcohol and ethylene-vinyl alcohol copolymer is preferable.

The thickness of the polarizer is not particularly limited, and is preferably 3 μm to 60 μm, more preferably 5 μm to 30 μm, and even more preferably 5 μm to 15 μm.

<Organic EL Display Panel>

The organic EL display panel is a member in which a light emitting layer or a plurality of organic compound thin films including a light emitting layer is formed between a pair of electrodes of an anode and a cathode. In addition to the light emitting layer, a hole injection layer, a hole transport layer, an electron injection layer, an electron transport layer, a protective layer, and the like may be provided, and each of these layers may have a different function. Various materials can be used to form the respective layers.

EXAMPLES

Hereinafter, the present invention will be more specifically described with examples. Materials, used amounts, ratios, treatment contents, treatment procedures, and the like of the following examples are able to be suitably changed unless the changes cause deviance from the gist of the present invention. Therefore, the range of the present invention will not be restrictively interpreted by the following examples.

[Photo-Alignment Agent SHD1]

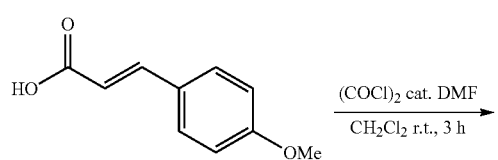

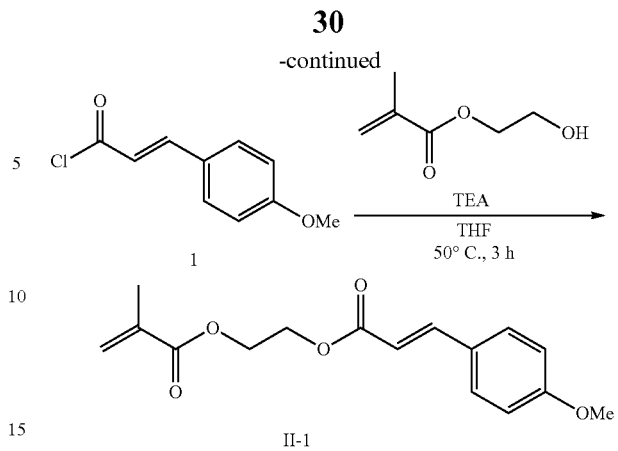

Synthesis of Intermediate 1

As shown in the above scheme, 200 g of a 4-methoxycinnamic acid, 800 mL of dichloromethane, and 5 drops of dimethylformamide (DMF) were mixed in a 2 L three-necked flask, and cooled to an internal temperature of 5° C. Next, 170.9 g of oxalyl chloride was added while maintaining the internal temperature at 10° C. or lower. After completion of the dropwise addition, the water bath was removed, and the temperature was raised to room temperature. Then, the mixture was stirred for 3 hours at room temperature. Thereafter, the solvent was distilled off to obtain 220.7 g of an intermediate 1 (4-methoxycinnamic acid chloride) (yield: 100%).

Synthesis of Monomer II-1

As shown in the above scheme, 161.8 g of 2-hydroxyethyl methacrylate, 249.9 g of triethylamine (TEA), and 1 L of tetrahydrofuran (THF) were mixed in a 3 L three-necked flask, and cooled to an internal temperature of 5° C. A 200 mL tetrahydrofuran solution of the intermediate 1 (220.7 g) was added dropwise thereto while maintaining the internal temperature at 15° C. or lower. The mixture was stirred for 3 hours at an internal temperature of 50° C. to 55° C. After the reaction liquid was cooled to room temperature, 1.2 L of ethyl acetate and 1.2 L of water were added, and the organic phase was subjected to liquid separation and washing in order of 1 L of 1N hydrochloric acid, 1 L of saturated sodium bicarbonate water, and 1 L of water. The organic phase was dried with magnesium sulfate, and the solvent was distilled off. The concentrate was purified by column chromatography to obtain 244.0 g of a monomer II-1 (yield: 75%).

Synthesis of Photo-Alignment Agent SHD1

A photo-alignment agent SHD1 represented by the following formula was synthesized according to the following scheme. A weight-average molecular weight (Mw) of the synthesized photo-alignment agent SHD1 was 10,600.

In the following scheme, "V-601" represents 2,2'-azobis (2-methylpropionate)dimethyl (manufactured by FUJIFILM WAKO PURE CHEMICAL CORPORATION).

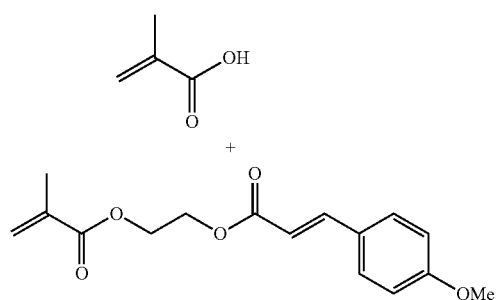

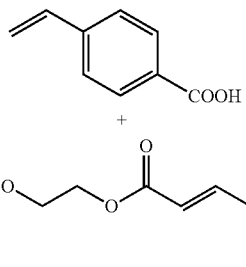

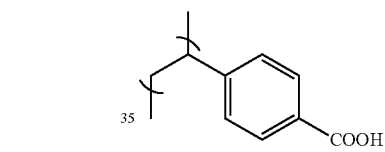

SHD1

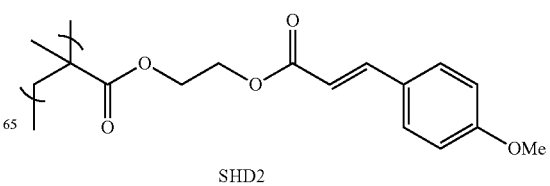

SHD2

[Photo-Alignment Agent SHD2]

Synthesis of Photo-Alignment Agent SHD2

A photo-alignment agent SHD2 represented by the following formula was synthesized according to the following scheme. The weight-average molecular weight (Mw) of the synthesized photo-alignment agent SHD2 was 8,900.

[Photo-Alignment Agent SHD3]

Synthesis of Photo-Alignment Agent SHD3

A photo-alignment agent SHD3 represented by the following formula was synthesized according to the following scheme. The weight-average molecular weight (Mw) of the synthesized photo-alignment agent SHD3 was 11,000.

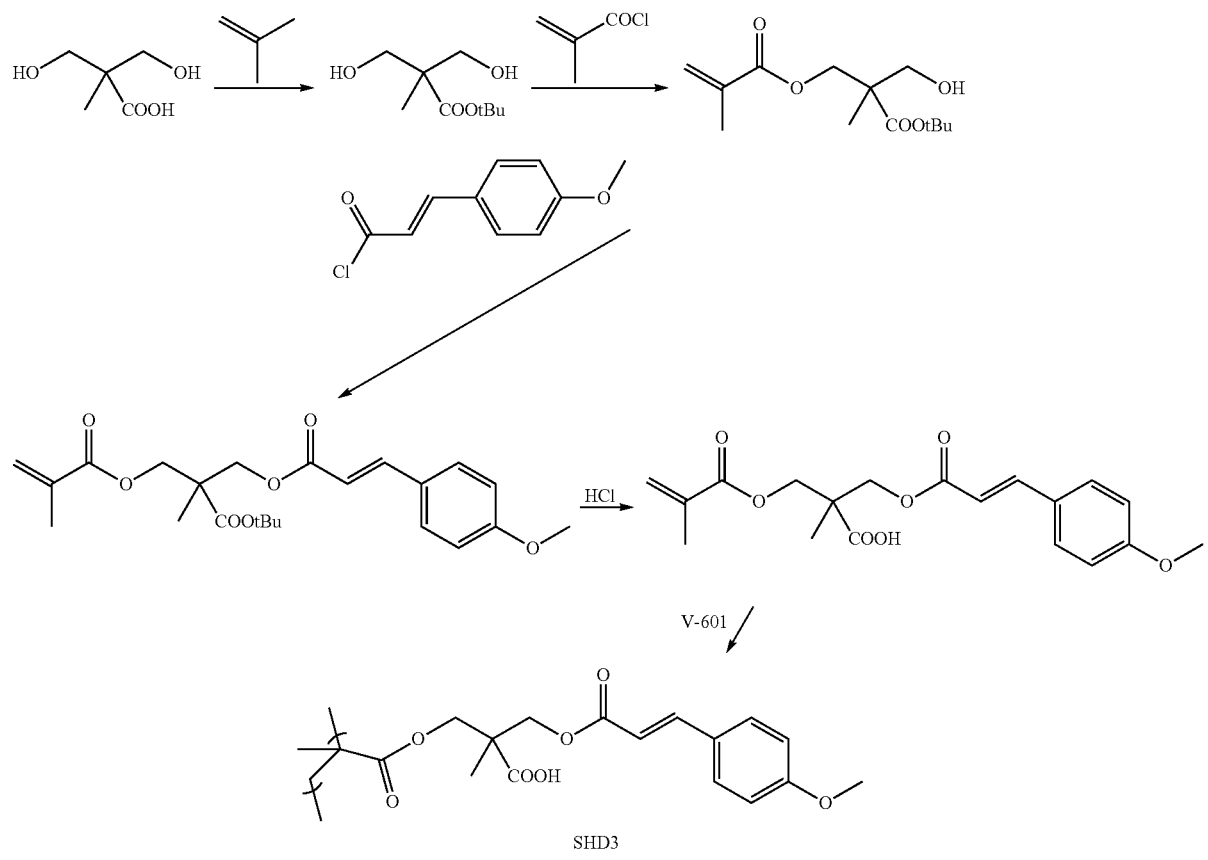

[Photo-Alignment Agent SHA1]

Synthesis of Photo-Alignment Agent SHA1

A photo-alignment agent SHA1 represented by the following formula was synthesized according to the following scheme. The weight-average molecular weight (Mw) of the synthesized photo-alignment agent SHA1 was 29,400.

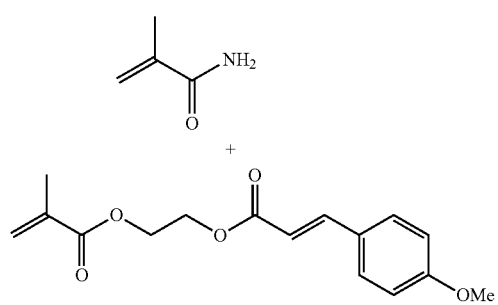

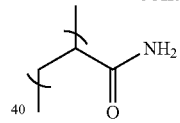

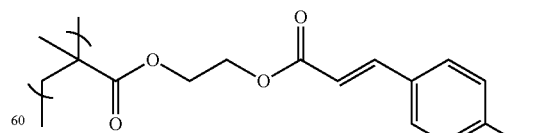

[Photo-Alignment Agent SHA2]

Synthesis of Photo-Alignment Agent SHA2

A photo-alignment agent SHA2 represented by the following formula was synthesized according to the following scheme. The weight-average molecular weight (Mw) of the synthesized photo-alignment agent SHA2 was 38,000.

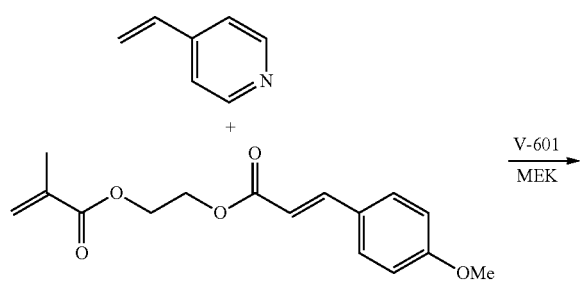

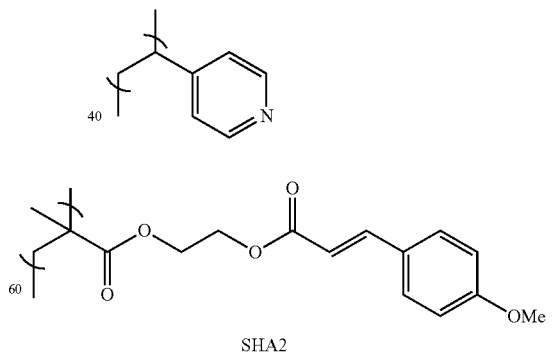

[Surfactant SKA1]

A surfactant SKA1 represented by the following formula was synthesized according to the following scheme.

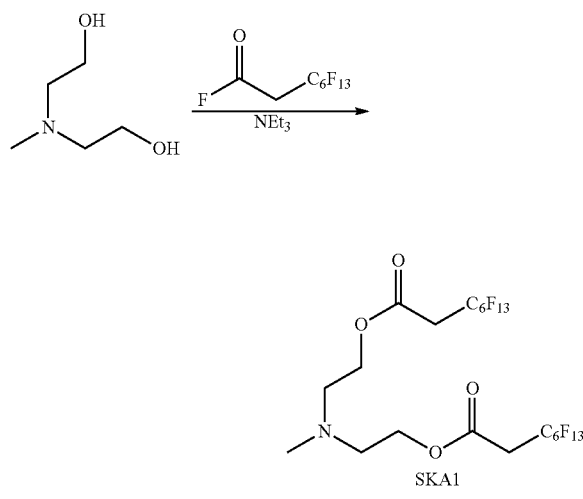

Example 1

[Production of Binder Layer]

An epoxy monomer (CEL2021P, manufactured by Daicel Corporation) (100 parts by mass), a photo-acid generator (B-1-1) (5.0 parts by mass) represented by the following formula, a photo-alignment agent SHD1 (2.0 parts by mass), and a surfactant SKA1 (1.0 part by mass) were dissolved in methyl ethyl ketone (300 parts by mass) to prepare a binder layer forming solution.

The prepared binder layer forming solution was spin-coated on a washed glass substrate, and irradiated with 500 mJ/cm² of ultraviolet rays using a 365 nm ultraviolet (UV)-light emitting diode (LED) at room temperature, and thus a binder layer was produced.

The film thickness was about 3 μm. The surface energy of the binder layer was 51 mN/m.

B-1-1

[Irradiation Step (Impartation of Alignment Function)]

The obtained binder layer was irradiated with 25 mJ/cm² of UV light (ultra-high pressure mercury lamp; UL750; manufactured by HOYA CANDEO OPTRONICS CORPORATION) (wavelength: 313 nm) passing through a wire grid polarizer at room temperature to impart an alignment function.

[Production of Optically Anisotropic Layer (upper layer)]

The following rod-like liquid crystal compound A (80 parts by mass), the following rod-like liquid crystal compound B (20 parts by mass), a photopolymerization initiator (IRGACURE 907, manufactured by BASF SE) (3 parts by mass), a sensitizer (KAYACURE DETX, manufactured by Nippon Kayaku Co., Ltd.) (1 part by mass), and the following horizontal alignment agent (0.3 parts by mass) were dissolved in methyl ethyl ketone (193 parts by mass) to prepare an optically anisotropic layer forming solution. The above-described optically anisotropic layer forming solution was applied to the binder layer having the alignment function imparted thereto by a wire bar coater #2.2, and heated for 2 minutes at 60° C., and at the temperature maintained at 60° C., irradiation with 300 mJ/cm² of ultraviolet rays was performed thereon using a 160 W/cm air-cooled metal halide lamp (manufactured by Eye Graphics Co., Ltd.) while nitrogen purge was conducted to make an atmosphere with an oxygen concentration of 1.0 vol % or less. Thus, an optically isotropic layer was formed, and an optical laminate was produced.

Rod-Like Liquid Crystal Compound A:

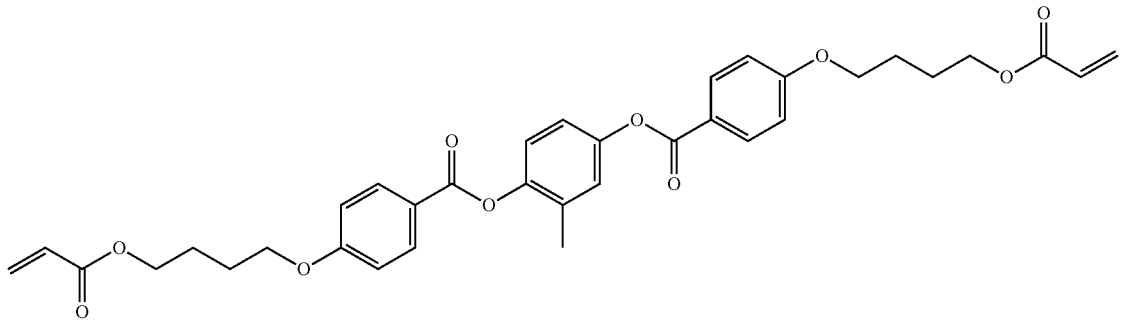

Rod-Like Liquid Crystal Compound B:

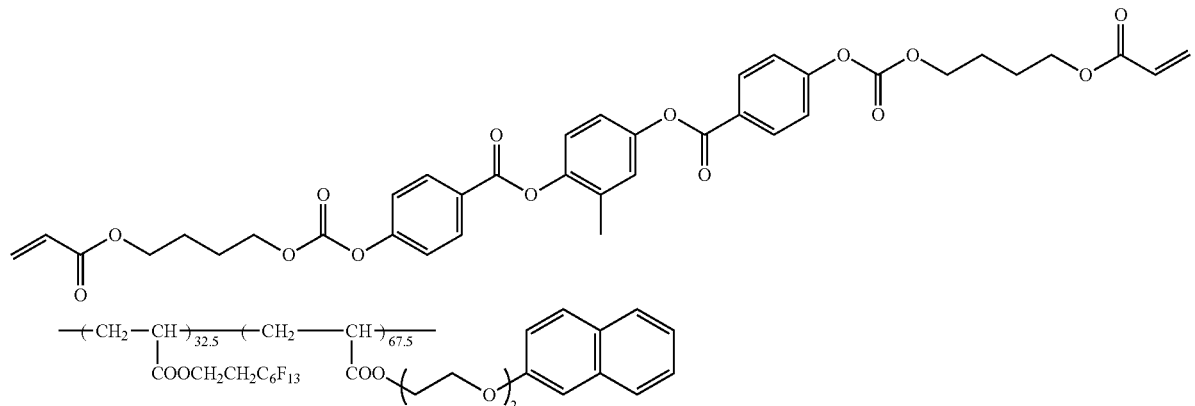

Horizontal Alignment Agent

Example 2

An optical laminate was produced in the same manner as in Example 1, except that the photo-alignment agent SHD1 was changed to a photo-alignment agent SHA1 and the surfactant SKA1 was changed to a surfactant SKD1 represented by the following formula.

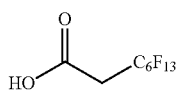

SKD1

Example 3

An optical laminate was produced in the same manner as in Example 1, except that the epoxy monomer was changed to EPOLEAD GT401 (manufactured by Daicel Corporation).

Example 4

[Production of Binder Layer]

An acrylic monomer (PETA, manufactured by OSAKA ORGANIC CHEMICAL INDUSTRY LTD.) (100 parts by mass), a photopolymerization initiator (IRGACURE 819, manufactured by BASF SE) (3 parts by mass), the photo-acid generator (B-1-1) (5.0 parts by mass), a photo-alignment agent SHD1 (2.0 parts by mass), and a surfactant SKA1 (1.0 part by mass) were dissolved in methyl ethyl ketone (300 parts by mass) to prepare a binder layer forming solution.

The prepared binder layer forming solution was spin-coated on a washed glass substrate, and irradiated with 500 mJ/cm$^2$ of ultraviolet rays using a 365 nm UV LED at room temperature, and thus a binder layer was produced. The film thickness was about 3 μm. The surface energy of the binder layer was 51 mN/m.

Thereafter, the irradiation step (impartation of alignment function) and the formation of an optically anisotropic layer (upper layer) were performed in the same manner as in Example 1 to produce an optical laminate.

Example 5

An optical laminate was produced in the same manner as in Example 4, except that the acrylic monomer was changed to A-DPH (manufactured by Shin-Nakamura Chemical Co., Ltd).

Example 6

[Production of Support]

A cellulose acylate film (TD40UL, manufactured by FUJIFILM Corporation) passed through dielectric heating rolls at a temperature of 60° C., and after the film surface temperature was raised to 40° C., an alkali solution having the following composition was applied to one surface of the film using a bar coater at a coating rate of 14 ml/m$^2$, and heated at 110° C.

Next, the film was transported for 10 seconds under a steam-type far-infrared heater manufactured by NORITAKE CO., LIMITED.

Next, pure water was applied at 3 ml/m² using the same bar coater.

Next, water washing by a fountain coater and dewatering by an air knife were repeated three times. Then, the film was transported and dried for 10 seconds in a drying zone at 70° C. to produce an alkali saponified cellulose acylate film, and the film was used as a support.

| Composition of Alkali Solution | |
|---|---|
| Potassium Hydroxide | 4.7 parts by mass |
| Water | 15.8 parts by mass |
| Isopropanol | 63.7 parts by mass |
| Surfactant ($C_{14}H_{29}O(CH_2CH_2O)_{20}H$) | 1.0 parts by mass |
| Propylene glycol | 14.8 parts by mass |

[Formation of Alignment Layer Y1]

An alignment layer coating liquid having the following composition was continuously applied to a long cellulose acetate film saponified as described above by a #14 wire bar. After the application, the liquid was dried by hot air at 60° C. for 60 seconds, and further dried by hot air at 100° C. for 120 seconds. In the following composition, "Polymerization Initiator (IN1)" represents a photopolymerization initiator (IRGACURE 2959, manufactured by BASF SE).

Next, a rubbing treatment was continuously performed on the dried coating film to form an alignment layer Y1. In this case, the longitudinal direction of the long film was parallel to the transport direction, and the rotation axis of the rubbing roller was in a clockwise direction of 45° with respect to the longitudinal direction of the film.

| Composition of Alignment Layer Coating Liquid | |
|---|---|
| Following Modified Polyvinyl Alcohol | 10.0 parts by mass |
| Water | 371.0 parts by mass |

| Composition of Alignment Layer Coating Liquid | |
|---|---|
| Methanol | 119.0 parts by mass |
| Glutaric Aldehyde | 0.5 parts by mass |
| Polymerization Initiator | 0.3 parts by mass |

(In the following structural formula, the ratio indicates a molar ratio.)

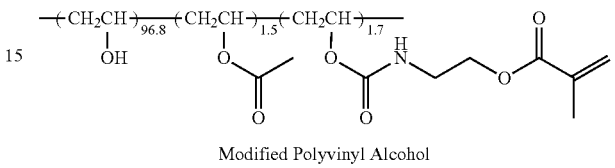

Modified Polyvinyl Alcohol

[Production of Binder Layer (Liquid Crystal Layer)]

The following rod-like liquid crystal compound A (80 parts by mass), the following rod-like liquid crystal compound B (20 parts by mass), a photopolymerization initiator (IRGACURE 819, manufactured by BASF SE) (3 parts by mass), the photo-acid generator (B-1-1) (5.0 parts by mass), the following vertical alignment agent A (1 part by mass), the following vertical alignment agent B (0.5 parts by mass), a photo-alignment agent SHD2 (2.0 parts by mass), and a surfactant SKA1 (1.5 parts by mass) were dissolved in 215 parts by mass of methyl ethyl ketone to prepare a liquid crystal layer forming solution.

The prepared liquid crystal layer forming solution was applied to the alignment layer by a #3.0 wire bar, heated for 2 minutes at 70° C., and cooled to 40° C. Then, irradiation with 500 mJ/cm² of ultraviolet rays was performed thereon using a 365 nm UV-LED while nitrogen purge was conducted to make an atmosphere with an oxygen concentration of 1.0 vol % or less. Thus, a liquid crystal layer was prepared.

The film thickness was about 1 μm. The surface energy of the binder layer was 50 mN/m.

Thereafter, the irradiation step (impartation of alignment function) and the formation of an optically anisotropic layer (upper layer) were performed in the same manner as in Example 1 to produce an optical laminate.

Rod-Like Liquid Crystal Compound A:

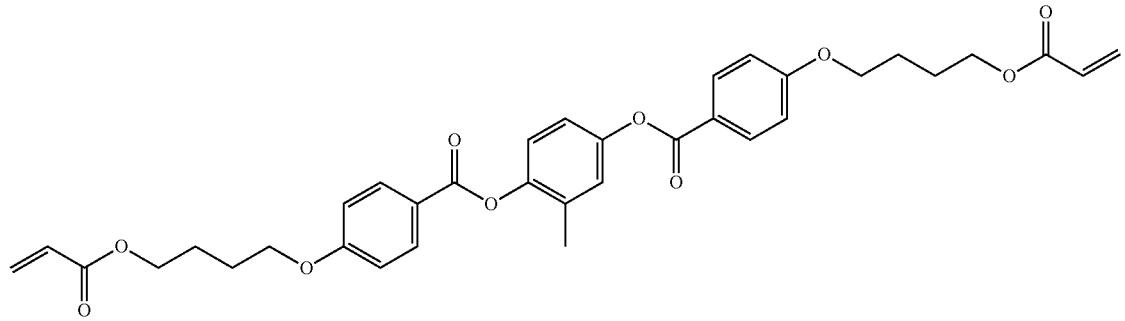

Rod-Like Liquid Crystal Compound B;

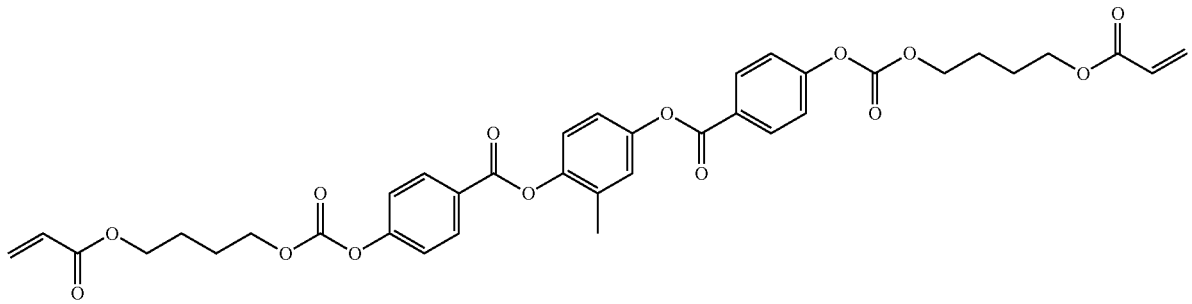

Vertical Alignment Agent A:

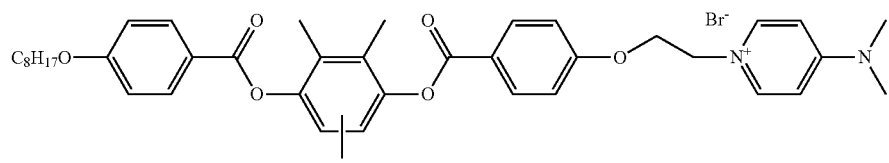

Vertical Alignment Agent B:

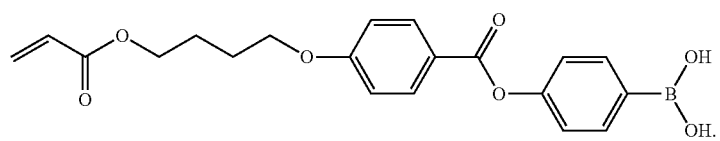

Example 7

[Production of Binder Layer (Liquid Crystal Layer)]

The rod-like liquid crystal compound A (80 parts by mass), the rod-like liquid crystal compound B (20 parts by mass), a photopolymerization initiator (IRGACURE 819, manufactured by BASF SE) (3 parts by mass), a vertical alignment agent A (1 part by mass), a vertical alignment agent B (0.5 parts by mass), a photo-alignment agent SHA2 (3.0 parts by mass), and a surfactant SKD1 (1.0 part by mass) were dissolved in 215 parts by mass of methyl ethyl ketone to prepare a liquid crystal layer forming solution. The prepared liquid crystal layer forming solution was applied to the alignment layer by a #3.0 wire bar, heated for 2 minutes at 70° C., and cooled to 40° C. Then, irradiation with 500 mJ/cm² of ultraviolet rays was performed thereon using a 365 nm UV-LED while nitrogen purge was conducted to make an atmosphere with an oxygen concentration of 1.0 vol % or less.

The film thickness was about 1 µm. The surface energy of the binder layer was 50 mN/m.

Thereafter, the irradiation step (impartation of alignment function) and the formation of an optically anisotropic layer (upper layer) were performed in the same manner as in Example 1 to produce an optical laminate.

Example 8

An optical laminate was produced in the same manner as in Example 6, except that the photo-alignment agent SHD2 was changed to a photo-alignment agent SHA1, and the surfactant SKA1 was changed to a surfactant SKD1.

Example 9

An optical laminate was produced in the same manner as in Example 6, except that the photo-alignment agent SHD2 was changed to a photo-alignment agent SHD3.

Comparative Example 1

An optical laminate was produced in the same manner as in Example 1, except that a photo-alignment agent H1 represented by the following formula was used instead of the photo-alignment agent SHD1.

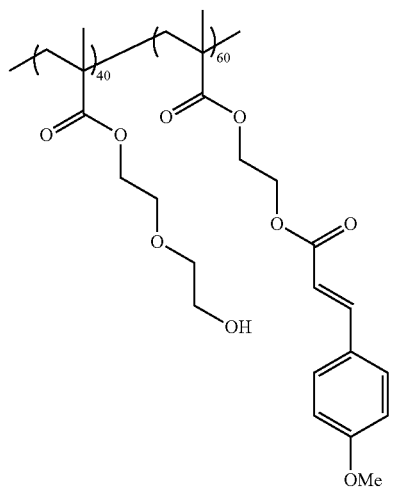

Comparative Example 2

An optical laminate was produced in the same manner as in Example 6, except that the following surfactant K1 was used instead of the surfactant SKA1.

K1

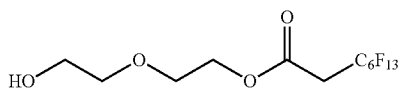

Comparative Example 3

An optical laminate was prepared in the same manner as in Example 6, except that the following photo-alignment agent H2 was used instead of the photo-alignment agent SHD2.

H2

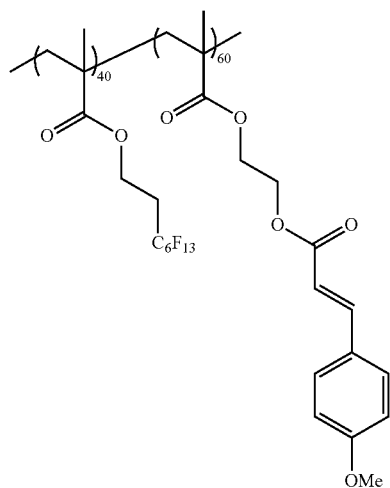

Comparative Example 4

A retardation plate (optical laminate) was produced in the same manner as in Example 2 of JP2014-215360A.

[Upper Layer Coatability]

The surface energy of the produced binder layer was measured, and the upper layer coatability was evaluated based on the following criteria. The results are shown in the following Table 1.

<Evaluation Criteria>

A: 45 mN/m or greater

B: 40 mN/m or greater and less than 45 mN/m

C: 30 mN/m or greater and less than 40 mN/m

D: less than 30 mN/m

[Liquid Crystal Aligning Properties]

Two polarizing plates were installed in crossed nicols, a sample obtained by laminating a binder layer and an optically anisotropic layer was installed therebetween, and the degree of light leakage was observed for evaluation according to the following criteria. The results are shown in the following Table 1.

<Evaluation Criteria>

A: There is no light leakage.

B: There is almost no light leakage.

C: Light leak is observed.

TABLE 1

|  | Binder Layer | | | Evaluation | |
|---|---|---|---|---|---|
|  |  |  |  |  | Liquid Crystal |
|  | Binder (polymerizable compound) | Photo-Alignment Agent | Surfactant | Upper Layer Coatability | Aligning Properties |
| Example 1 | CEL2021P | SHD1 | SKA1 | A | B |
| Example 2 | CEL2021P | SHA1 | SKD1 | A | B |
| Example 3 | EPOLEAD GT401 | SHD1 | SKA1 | A | B |
| Example 4 | PETA | SHD1 | SKA1 | A | B |
| Example 5 | A-DPH | SHD1 | SKA1 | A | B |
| Example 6 | Rod-Like Liquid Crystal Compound A Rod-Like Liquid Crystal Compound B | SHD2 | SKA1 | A | B |
| Example 7 | Rod-Like Liquid Crystal Compound A Rod-Like Liquid Crystal Compound B | SHA2 | SKD1 | A | B |
| Example 8 | Rod-Like Liquid Crystal Compound A Rod-Like Liquid Crystal Compound B | SHA1 | SKD1 | A | B |
| Example 9 | Rod-Like Liquid Crystal Compound A Rod-Like Liquid Crystal Compound B | SHD3 | SKA1 | A | B |
| Comparative Example 1 | CEL2021P | H1 | SKA1 | A | C |
| Comparative Example 2 | Rod-Like Liquid Crystal Compound A Rod-Like Liquid Crystal Compound B | SHD2 | K1 | A | C |

TABLE 1-continued

| | Binder Layer | | | Evaluation | |
| --- | --- | --- | --- | --- | --- |
| | | | | Liquid Crystal | |
| | Binder (polymerizable compound) | Photo-Alignment Agent | Surfactant | Upper Layer Coatability | Aligning Properties |
| Comparative Example 3 | Rod-Like Liquid Crystal Compound A Rod-Like Liquid Crystal Compound B | H2 | SKA1 | D | C |
| Comparative Example 4 | First Optically Anisotropic Layer of Example 2 in JP2014-215360A | | | A | C |

From the results shown in Table 1, it has been found that in a case where a surfactant and a photo-alignment agent are blended and do not include functional groups capable of hydrogen bonding with each other, any one or both of the upper layer coatability and the liquid crystal aligning properties deteriorate (Comparative Examples 1 to 4).

In contrast, it has been found that in a case where a surfactant and a photo-alignment agent including functional groups capable of hydrogen bonding with each other are blended, excellent upper layer coatability is provided after formation as a binder layer and the liquid crystal aligning properties are improved (Examples 1 to 9).

What is claimed is:

1. A binder composition comprising:
   a binder;
   a polymerization initiator;
   a surfactant; and
   a photo-alignment agent,
   wherein the surfactant and the photo-alignment agent include functional groups capable of hydrogen bonding with each other,
   the functional group capable of hydrogen bonding included in any one of the surfactant or the photo-alignment agent is a proton-donating functional group, and the functional group included in the other of the surfactant or the photo-alignment agent is a proton-accepting functional group,
   a content of the photo-alignment agent is 0.1 to 10 parts by mass with respect to 100 parts by mass of the binder, and
   the binder comprises a polymerizable liquid crystal compound.

2. The binder composition according to claim 1, wherein the proton-donating functional group is at least one type of functional group selected from the group consisting of —COON, —SO$_3$H, —PO$_3$H, —SO$_2$H, —(Rs)Si(Rs)OH, a hydroxyl group substituted for a hydrogen atom on an aromatic ring, and a mercapto group substituted for a hydrogen atom on an aromatic ring, and
   the proton-accepting functional group is at least one type of functional group selected from the group consisting of —NH$_2$, —NH—, —N(Rt)-, and —N=,
   where Rs and Rt represent a substituent in the functional groups.

3. The binder composition according to claim 1, wherein the surfactant is a low-molecular-weight compound or an oligomer, and the photo-alignment agent is an oligomer or a polymer compound.

4. The binder composition according to claim 1, wherein the surfactant is a compound represented by any one of Formula (1-1), Formula (1-2), or Formula (1-3),

in the above formulae, in represents an integer of 1 to 5,
n represents an integer of 1 to 5,
where a sum of m and n represents an integer of 2 to 6,
HB represents the functional group capable of hydrogen bonding, and in a case where m is an integer of 2 to 5, a plurality of HB's may be the same as or different from each other,
X$^1$ and X$^2$ each independently represent a single bond or a divalent linking group, in a case where m is an integer of 2 to 5, a plurality of X$^1$'s may be the same as or different from each other, and in a case where n is an integer of 2 to 5, a plurality of X$^2$'s may be the same as or different from each other,
X$^3$ represents a single bond or a divalent to hexavalent linking group, and
RL represents a substituent containing a fluorine atom or a silicon atom or an alkyl group having 6 or more carbon atoms, and in a case where n is an integer of 2 to 5, a plurality of RL's may be the same as or different from each other.

5. The binder composition according to claim 1, wherein the photo-alignment agent is a polymer having a repeating unit represented by any one of Formula (2-1), Formula (2-2), or Formula (2-3), or a repeating unit represented by any one of Formula (3-1), Formula (3-2), or Formula (3-3),

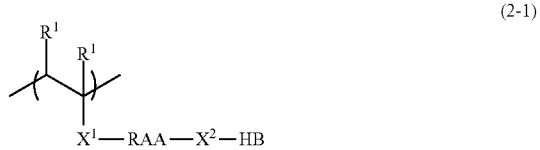

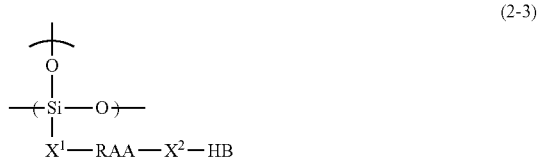

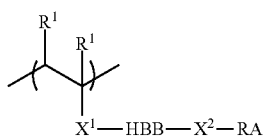
(3-1)

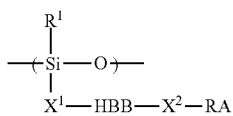
(3-2)

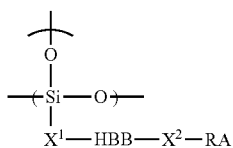
(3-3)

in the above formulae, $R^1$ represents a hydrogen atom or an alkyl group having 1 to 3 carbon atoms, and a plurality of R1's in Formulae (2-1) and (3-1) may be the same as or different from each other, $X^1$ and $X^2$ each independently represent a single bond or a divalent linking group, RAA represents a divalent linking group containing a photo-alignment group, and HB represents the functional group capable of hydrogen bonding, and HBB represents a divalent linking group containing the functional group capable of hydrogen bonding, and RA represents a photo-alignment group.

6. The binder composition according to claim 1, wherein the photo-alignment agent is a copolymer having a repeating unit represented by any one of Formula (4-1-1), Formula (4-1-2), or Formula (4-1-3) and a repeating unit represented by any one of Formula (4-2-1), Formula (4-2-2), or Formula (4-2-3),

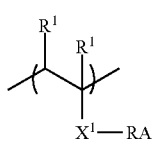
(4-1-1)

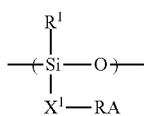
(4-1-2)

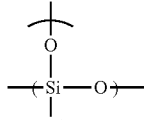
(4-1-3)

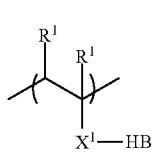
(4-2-1)

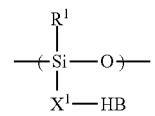
(4-2-2)

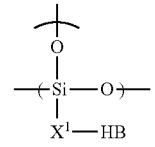
(4-2-3)

in the above formulae, $R^1$ represents a hydrogen atom or an alkyl group having 1 to 3 carbon atoms, and a plurality of $R^1$'s in Formulae (4-1-1) and (4-2-1) may be the same as or different from each other, $X^1$ represents a single bond or a divalent linking group, and RA represents a photo-alignment group, and HB represents the functional group capable of hydrogen bonding.

7. The binder composition according to claim 1, wherein the photo-alignment agent is a polymer having a repeating unit represented by any one of Formula (5-1), Formula (5-2), or Formula (5-3),

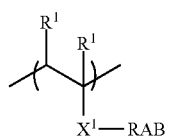
(5-1)

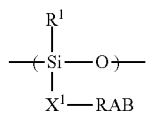
(5-2)

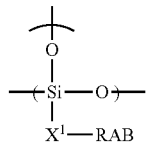
(5-3)

in the formulae, $R^1$ represents a hydrogen atom or an alkyl group having 1 to 3 carbon atoms, and a plurality of $R^1$'s in Formula (5-1) may be the same as or different from each other, $X^1$ represents a single bond or a divalent linking group, and RAB represents a substituent having both a photo-alignment group and the functional group capable of hydrogen bonding.

8. A binder layer which is formed using the binder composition according to claim 1.

9. An optical laminate comprising:

the binder layer according to claim 8; and an optically anisotropic layer which is provided on the binder layer, wherein the optically anisotropic layer is formed using a polymerizable liquid crystal composition containing a polymerizable liquid crystal compound, and the binder layer and the optically anisotropic layer are laminated adjacent to each other.

10. An image display device comprising:
the binder layer according to claim 8.

11. An image display device comprising:
the optical laminate according to claim 9.

* * * * *